(12) United States Patent
Oda et al.

(10) Patent No.: US 11,086,457 B2
(45) Date of Patent: Aug. 10, 2021

(54) POSITION POINTER

(71) Applicant: Wacom Co., Ltd., Saitama (JP)

(72) Inventors: Yasuo Oda, Saitama (JP); Masaki Yagi, Saitama (JP); Yoshihisa Sugiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/780,467

(22) Filed: Feb. 3, 2020

(65) Prior Publication Data

US 2020/0174588 A1     Jun. 4, 2020

Related U.S. Application Data

(63) Continuation of application No. 16/389,485, filed on Apr. 19, 2019, now Pat. No. 10,551,946, which is a
(Continued)

(30) Foreign Application Priority Data

Apr. 11, 2011    (JP) ................................ 2011-087450

(51) Int. Cl.
    *G06F 3/038*       (2013.01)
    *G06F 3/044*       (2006.01)
    (Continued)

(52) U.S. Cl.
    CPC .......... *G06F 3/0442* (2019.05); *G06F 1/3262* (2013.01); *G06F 3/0383* (2013.01);
    (Continued)

(58) Field of Classification Search
    CPC .... G06F 3/046; G06F 3/03545; G06F 3/0383; G06F 3/041; G06F 3/044; G06F 1/3262
(Continued)

(56) References Cited

U.S. PATENT DOCUMENTS

| | | |
|---|---|---|
| 2,012,032 A | 8/1935 | Zinnbauer |
| 5,206,785 A | 4/1993 | Hukashima |
| (Continued) | | |

FOREIGN PATENT DOCUMENTS

| | | |
|---|---|---|
| EP | 1 531 389 A2 | 5/2005 |
| EP | 1 837 744 A2 | 9/2007 |
| (Continued) | | |

OTHER PUBLICATIONS

Israel Office Action dated Apr. 28, 2015, for corresponding IL Application No. 218561, 4 pages.
(Continued)

*Primary Examiner* — Christopher E Leiby
(74) *Attorney, Agent, or Firm* — Seed IP Law Group LLP

(57) ABSTRACT

A position pointer is provided for indicating a position on a sensor of a position detection device. The position pointer includes an elongate pointer body having a distal end and a proximal end; a first electrode disposed near the distal end; and a second electrode different from the first electrode and disposed near the distal end, wherein both the first and second electrodes are capacitively coupleable with the sensor of the position detection device. The position pointer includes a detection circuit configured to intermittently detect signals transmitted from the position detection device; a signal circuit configured to generate a position signal to be transmitted to the position detection device; and a transmission circuit configured to control transmission of the position signal. The transmission circuit, based on a detection result of the detection circuit, controls transmission of the position signal via the first electrode.

20 Claims, 13 Drawing Sheets

Related U.S. Application Data continuation of application No. 15/894,576, filed on Feb. 12, 2018, now Pat. No. 10,310,641, which is a continuation of application No. 14/997,234, filed on Jan. 15, 2016, now Pat. No. 9,927,889, which is a continuation of application No. 13/420,305, filed on Mar. 14, 2012, now Pat. No. 9,268,417.

(51) Int. Cl.
*G06F 3/046* (2006.01)
*G06F 3/041* (2006.01)
*G06F 1/3234* (2019.01)
*G06F 3/0354* (2013.01)

(52) U.S. Cl.
CPC .......... *G06F 3/03545* (2013.01); *G06F 3/041* (2013.01); *G06F 3/046* (2013.01); *G06F 3/0441* (2019.05); *G06F 3/0445* (2019.05); *G06F 3/0446* (2019.05)

(58) Field of Classification Search
USPC .................................................. 345/156, 179
See application file for complete search history.

(56) References Cited

U.S. PATENT DOCUMENTS

| | | | |
|---|---|---|---|
| 5,414,227 A | | 5/1995 | Schubert et al. |
| 5,798,756 A | | 8/1998 | Yoshida et al. |
| 5,854,448 A | | 12/1998 | Nozaki et al. |
| 6,473,072 B1 | | 10/2002 | Comiskey et al. |
| 7,868,873 B2 * | | 1/2011 | Palay ................. G06F 3/03545 |
| | | | 345/173 |
| 8,368,669 B2 | | 2/2013 | Katsurahira |
| 8,878,823 B1 | | 11/2014 | Kremin et al. |
| 2001/0038384 A1 | | 11/2001 | Fukushima et al. |
| 2002/0108446 A1 | | 8/2002 | Matsuki et al. |
| 2005/0128191 A1 | | 6/2005 | Katsurahira et al. |
| 2008/0150917 A1 | | 6/2008 | Libbey et al. |
| 2009/0076770 A1 | | 3/2009 | Fukushima et al. |
| 2009/0139780 A1 | | 6/2009 | Katsurahira et al. |
| 2010/0021022 A1 | | 1/2010 | Pittel et al. |
| 2010/0053120 A1 | | 3/2010 | Chang et al. |
| 2010/0170726 A1 | | 7/2010 | Yeh et al. |
| 2012/0086664 A1 | | 4/2012 | Leto |
| 2012/0154340 A1 * | | 6/2012 | Vuppu ................. G06F 3/0442 |
| | | | 345/179 |
| 2012/0223919 A1 * | | 9/2012 | Lin ...................... G06F 3/0441 |
| | | | 345/179 |
| 2014/0002422 A1 | | 1/2014 | Stern et al. |
| 2017/0262071 A1 | | 9/2017 | Chang et al. |

FOREIGN PATENT DOCUMENTS

| | | |
|---|---|---|
| JP | 6-119101 A | 4/1994 |
| JP | 7-295722 A | 11/1995 |
| JP | 8-272509 A | 10/1996 |
| JP | 2007-183809 A | 7/2007 |
| TW | M371273 U1 | 12/2009 |

OTHER PUBLICATIONS

Partial European Search Report, dated Oct. 4, 2017, for European Application No. 12163666.6-1972 I 2511800, 8 pages.

Taiwanese Office Action dated Mar. 9, 2016, for corresponding TW Application No. 101110572, 5 pages.

\* cited by examiner

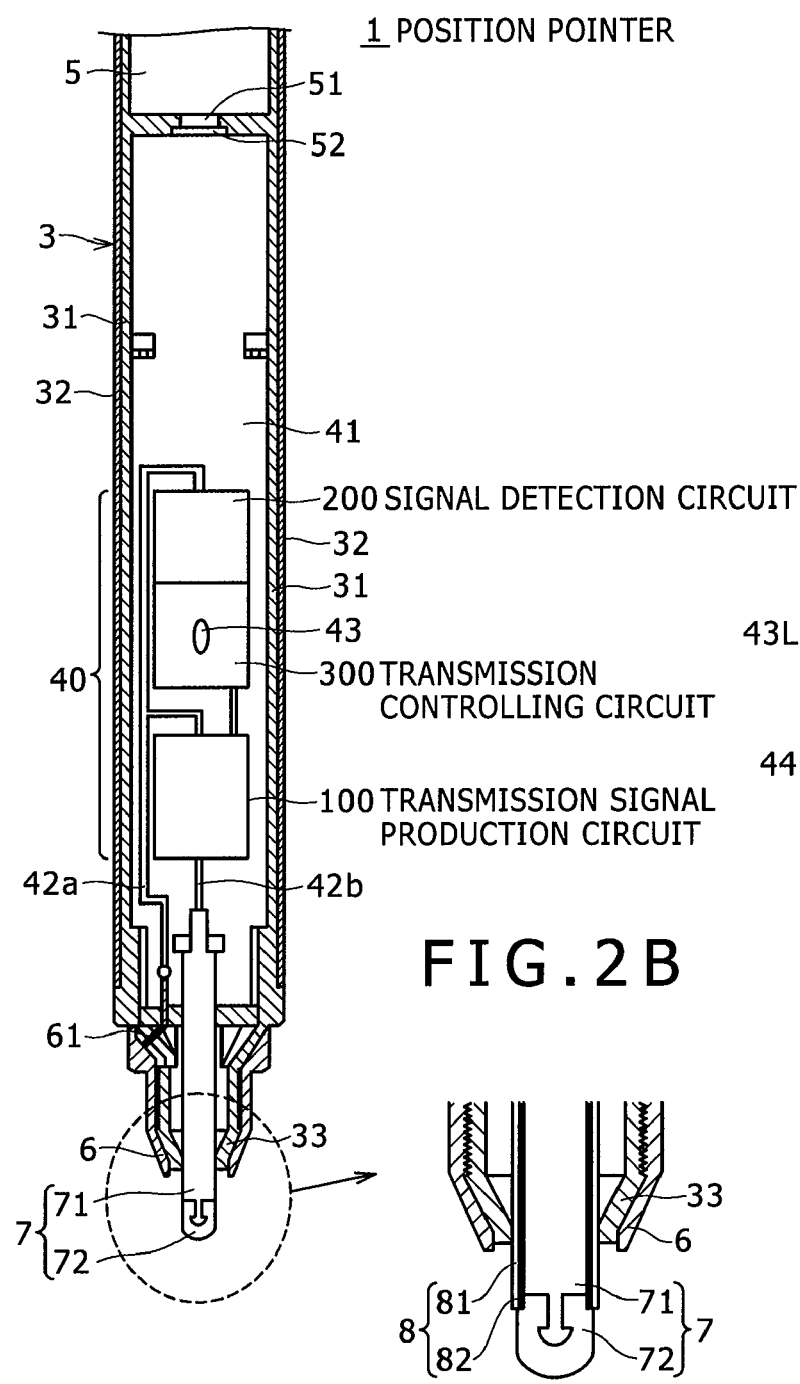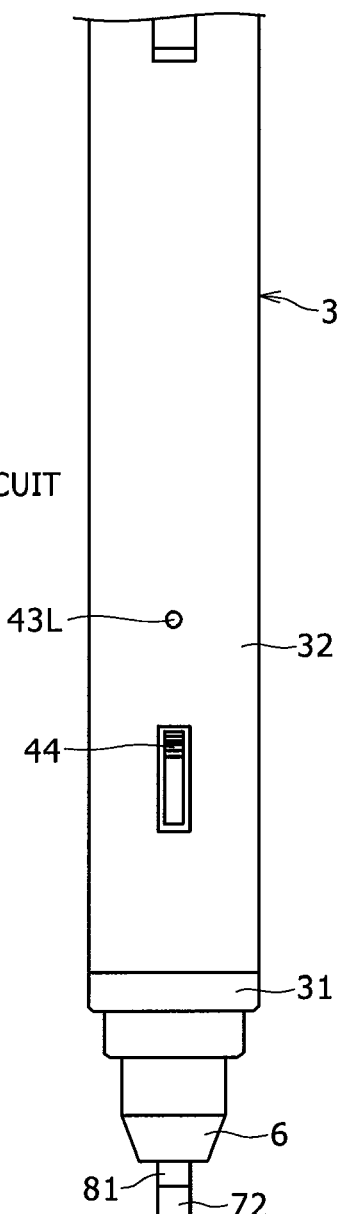

us 11,086,457 B2

POSITION POINTER

CROSS REFERENCE TO RELATED APPLICATION

The present application is a continuation of U.S. application Ser. No. 13/420,305 filed Mar. 14, 2012 which claims priority under 35 U.S.C. 119(a) of Japanese Application No. 2011-087450, filed Apr. 11, 2011, the entire content of which is incorporated herein by reference.

TECHNICAL FIELD

This invention relates to a position pointer for use with a position detection sensor.

BACKGROUND ART

Various kinds of position pointers for use with a position detection sensor have been proposed. For example, in Patent Document 1 (Japanese Patent Laid-Open No. Hei 7-295722) and Patent Document 2 (Japanese Patent Laid-Open No. Hei 8-272509), a coordinate inputting apparatus is disclosed, in which a position pointer includes a generator of an AC signal and a battery as a driving power supply such that the position detection sensor detects a signal in response to the AC signal transmitted from the position pointer to thereby detect the position of the position pointer.

Further, Patent Document 3 (Japanese Patent Laid-Open No. 2007-183809) discloses a position pointer, which includes a switching circuit capable of switching a state of a conductor at a pen tip between a signal reception state and a signal transmission state to thereby form a signal processing circuit having a so-called half-duplex communication configuration, and a battery as a driving power supply.

In the position pointer of Patent Document 3, the switching circuit is changed over (switched) between the signal reception side and the signal transmission side after each predetermined time period by a timing controlling circuit. During signal reception, a conductor at a pen tip receives an AC signal from a position detection sensor, and another AC signal synchronized with the received AC signal is produced by the signal processing circuit. Then, during a period in which the switching circuit is switched to the signal transmission side, the AC signal produced by the signal processing circuit is transmitted to the position detection sensor from the pen tip conductor, which has received the AC signal from the position detection sensor. The position detection sensor detects the signal from the position pointer, thereby detecting the position of the position pointer.

PRIOR ART DOCUMENT

[Patent Document 1]
Japanese Patent Laid-Open No. Hei 7-295722
[Patent Document 2]
Japanese Patent Laid-Open No. Hei 8-272509
[Patent Document 3]
Japanese Patent Laid-Open No. 2007-183809

SUMMARY OF THE INVENTION

Problems to be Solved by the Invention

The position pointers disclosed in Patent Documents 1 to 3 described above are each configured such that it includes a power supply switch and, when the power supply switch is on, a power supply voltage is normally supplied from the battery as the driving power supply to the AC signal generator or the signal processing circuit. Therefore, there is a problem that, when the power supply switch is on, even if the position pointer is not placed in an operative state on the position detection sensor, that is, even if the position pointer is not placed in a state in which it is used together with the position detection sensor, the power supply voltage is normally supplied from the battery to the various components, resulting in power consumption.

By diligently switching on or off the power supply switch in response to a use situation of the position pointer, wasteful power consumption can be reduced to some degree. However, in this case, the power supply switch must be operated frequently, which may impact the frequency at which a battery needs to be exchanged when the battery is used as the driving power supply.

According to various embodiments, the present invention is directed to providing a position pointer, which can reduce wasteful power consumption and achieve power saving.

Means for Solving the Problems

In order to solve the problems described above, according to an embodiment of the present invention, a position pointer is provided for use with a position detection sensor, and the position pointer includes:

a first electrode configured to receive an AC signal from the position detection sensor;

a transmission signal production circuit configured to produce a signal based on which the position detection sensor detects a position;

a second electrode different from the first electrode and configured to receive the signal produced by the transmission signal production circuit;

a signal detection circuit configured to detect whether or not the AC signal from the position detection sensor is received through the first electrode; and a transmission controlling circuit configured to control transmission of the signal from the transmission signal production circuit through the second electrode in response to an output from the signal detection circuit, wherein the first and second electrodes are disposed at the same end portion of the position pointer, and wherein the signal based on which the position detection sensor detects a position is transmitted from the second electrode in response to the detection of the AC signal received from the position detection sensor through the first electrode.

In the position pointer of an embodiment of the present invention having the configuration described above, if it is placed in a position such as a position on the position detection sensor or the like where it is to be used together with the position detection sensor, then an AC signal received from the position detection sensor thorough the first electrode is detected by the signal detection circuit. Then, in response to an output from the signal detection circuit, the signal from the transmission signal production circuit, based on which the position detection sensor detects the position, is controlled by the transmission controlling circuit so that the signal is transmitted from the second electrode to the position detection sensor.

On the other hand, when the signal detection circuit is in a state in which it does not detect the AC signal from the position detection sensor, that is, when the position pointer of the present invention does not exist on the position detection sensor and is not in a state in which it is to be used together with the position detection sensor, the signal from the transmission signal production circuit is controlled by the transmission controlling signal so that the signal is not transmitted from the second electrode to the position detection sensor.

Effect of the Invention

With the position pointer of the present invention, only when the position pointer exists at a position where it is to be used together with the position detection sensor, such as a position on (above) the position detection sensor, the signal from the transmission signal production circuit is transmitted to the position detection sensor, and wasteful power consumption is reduced and power saving can be achieved.

BRIEF DESCRIPTION OF THE DRAWINGS

FIGS. 2A, 2B and 2C are views showing an example of a configuration of the first embodiment of the position pointer according to the present invention.

DESCRIPTION OF THE INVENTION

First Embodiment

Figure 1:
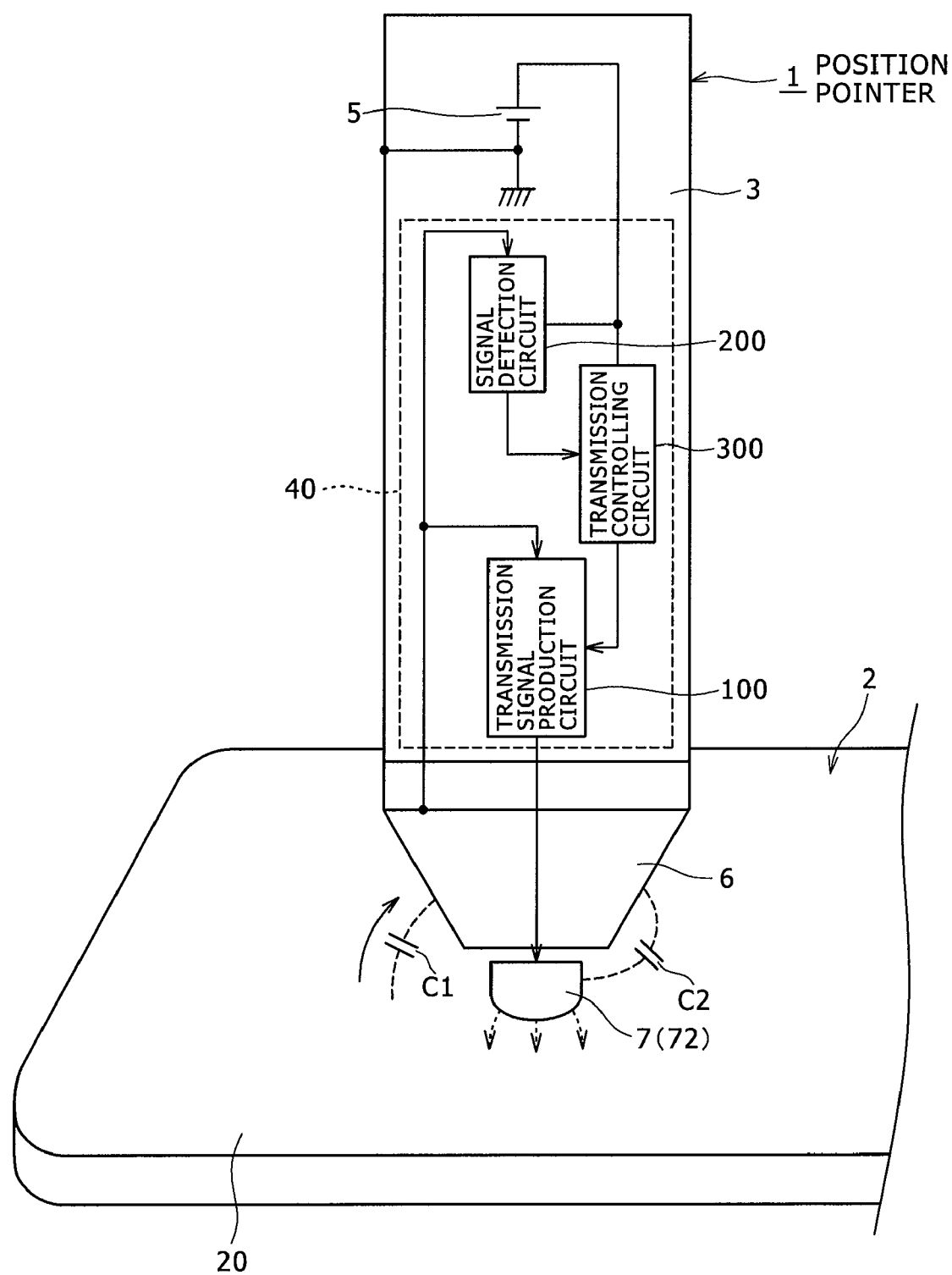
FIG. 1 is a view schematically illustrating a configuration and processing operations of a first embodiment of a position pointer according to the present invention.

In the following, embodiments of a position pointer according to the present invention are described with reference to the drawings. FIG. 1 is a view schematically showing a configuration and processing operations of a position pointer 1 of a first embodiment of the present invention, illustrating a state in which the position pointer 1 is positioned on a plate face of a position detection sensor 2 of the capacitance type. FIGS. 2A, 2B and 2C are views showing a detailed example of a configuration of the position pointer 1: FIG. 2A is a partial longitudinal sectional view of the position pointer 1; FIG. 2B is a partial enlarged view of FIG. 2A; and FIG. 2C is a view showing a portion of an outer appearance of the position pointer 1. In the present embodiment, the position pointer 1 is formed such that its outer appearance has a form of a stylus having a cylindrical (rod) shape.

The position pointer 1 of the present embodiment includes a housing 3 of a rod shape. This housing 3 is formed from an insulator portion 31 of a hollow cylindrical shape made of an insulating material such as a synthetic resin. In the present embodiment, at least a portion of an outer peripheral surface of the insulator portion 31 of the housing 3, at which an operator grips the position pointer 1, is covered with a conductor portion 32 made of, for example, a metal.

In the housing 3, a printed wiring board 41 is disposed. The conductor portion 32 which covers the outer peripheral surface of the housing 3 is electrically connected to a grounding conductor of the printed wiring board 41.

An internal processing circuit 40 of the position pointer 1 is formed on the printed wiring board 41 and includes: a plurality of electronic parts including resistors, capacitors, ICs (Integrated Circuits) and so forth; wiring patterns such as conductive patterns 42a and 42b; and a boosting transformer hereinafter described. The internal processing circuit 40 in the present example further includes an LED (Light Emitting Diode) 43 for on/off indication of a transmission drive state of the position pointer 1, and so forth. As shown in FIGS. 1, 2A, 2B and 2C, the internal processing circuit 40 is formed of a transmission signal production circuit 100, a signal detection circuit 200, and a transmission controlling circuit 300.

Further, in the present embodiment, the housing 3 is configured such that a battery 5 can be accommodated therein, and the power supply voltage for the internal processing circuit 40 is generated by the battery 5. In FIG. 2A, a battery connection terminal 52 is a terminal electrically connected to a power supply circuit included in the internal processing circuit 40 on the printed wiring board 41 and is provided at an end portion of the printed wiring board 41. A positive side electrode 51 of the battery 5 contacts with and is electrically connected to the battery connection terminal 52. Though not shown, the negative side electrode of the battery 5 is directly connected to the grounding conductor of the printed wiring board 41. Or, the negative side electrode of the battery 5 is pressed against and contacted with an elastically deformable terminal, which is electrically connected to the conductor portion 32 of the housing 3, to be connected to the grounding conductor of the printed wiring board 41.

As hereinafter described, the LED 43 is configured such that, under the control of the transmission controlling circuit 300 based on a detection output of the signal detection circuit 200, the LED 43 is turned on when a transmission signal produced by the transmission signal production circuit 100 is sent out from the position pointer 1, and is turned off when a transmission signal is not sent out from the position pointer 1. On the outer peripheral surface of the housing 3 corresponding to the position of the LED 43, a light transmitting member 43L is provided such that the user can confirm the presence/absence of transmission from the position pointer 1 by confirming the turning on or off of the LED 43 through the light transmitting member 43L.

Further, on the outer peripheral surface of the housing 3, also a sliding operation section 44 is provided such that it can manually vary the resistance value of a variable resistor 107 hereinafter described, which is provided in the transmission signal production circuit 100 of the internal processing circuit 40, in order to change the signal detection sensitivity of the position pointer 1.

One end portion side in the direction of the center axis of the insulator portion 31 of a hollow cylindrical shape, which forms the housing 3, is formed as a tapering portion 33 which gradually tapers. A peripheral electrode 6 formed of, for example, an annular conductive material is attached to an outer peripheral side of the tapering portion 33. It is to be noted that the peripheral electrode 6 and the conductor portion 32 on the outer peripheral surface of the housing 3 are isolated from each other by the insulator portion 31 interposed therebetween.

The peripheral electrode 6 forms, in the present example, a first electrode and is electrically connected to the conductive pattern 42a of the printed wiring board 41 by a lead conductor member 61 penetrating through the insulator portion 31. This conductive pattern 42a is connected, in the present example, to an input terminal of the transmission signal production circuit 100 and an input terminal of the signal detection circuit 200 of the internal processing circuit 40.

Further, in the present embodiment, a central electrode 7 is provided such that it projects to the outside from the hollow portion of the tapering portion 33. The central electrode 7 forms, in the present example, a second electrode. This central electrode 7 is configured from a rod-like conductor 71 made of, for example, a conductive metal, and an elastic protective conductor 72 provided at a tip end of the rod-like conductor 71. The rod-like conductor 71 is provided such that it extends from a predetermined position on the printed wiring board 41 in the housing 3 to penetrate through the hollow portion of the tapering portion 33 and to project to the outside. The elastic protective conductor 72 is a member for preventing the pointing inputting surface of the position detection sensor 2 from being damaged when the position pointer 1 is brought into contact with the position detection sensor 2, and for ensuring a large contact area with the pointing inputting surface. The elastic protective conductor 72 is, in the present example, configured from a conductive elastic member. It is to be noted that the surface of the conductive elastic member may be coated with resin, if desired or necessary. Or, the elastic protective conductor 72 may be omitted. In this instance, the rod-like conductor 71 may be configured, for example, from a conductive elastic member.

This central electrode 7 forms, in the present example, the second electrode. The central electrode 7 is secured, at an end portion of the rod-like conductor 71 which is on the opposite side to the side on which the elastic protective conductor 72 is provided, to the printed wiring board 41, and is electrically connected to the conductive pattern 42b. This conductive pattern 42b is, in the present example, connected to an output terminal of the transmission signal production circuit 100 of the internal processing circuit 40.

Further, between the peripheral electrode 6 and the central electrode 7, a shield member 8 is provided for effectively preventing electric interference between them. In the present embodiment, the shield member 8 is provided in such a manner as to surround the central electrode 7, thereby interposing between the peripheral electrode 6 and the central electrode 7 to minimize capacitive coupling between the peripheral electrode 6 and the central electrode 7.

As shown in FIG. 2B, which is an enlarged view of the tip end portion of FIG. 2A, the shield member 8 is configured from a tubular conductor 81 formed of a conductive member and an insulating layer 82 formed on an inner wall face thereof. The tubular conductor 81 is electrically connected to the grounding conductor of the printed wiring board 41.

The rod-like conductor 71 of the central electrode 7 is accommodated in the hollow portion of the tubular conductor 81 having the insulating layer 82 on the inner wall face thereof such that the central electrode 7 is surrounded by the shield member 8. In the example of FIGS. 2A, 2B and 2C, a portion of the elastic protective conductor 72 of the central electrode 7 is configured so as to be also surrounded by the tubular conductor 81 of the shield member 8.

The peripheral electrode 6 and the tubular conductor 81 of the shield member 8 are isolated from each other by the tapering portion 33 of the insulator portion 31 interposed therebetween. The central electrode 7 and the tubular conductor 81 of the shield member 8 are isolated from each other by the insulating layer 82 on the inner wall face of the tubular conductor 81 of the shield member 8 interposed therebetween.

It is to be noted that, while shielding is applied only to the central electrode 7 in the example of FIGS. 2A, 2B and 2C, it may instead be applied to the peripheral electrode 6. Or, shielding may be applied to both of the peripheral electrode 6 and the central electrode 7.

Further, while in the example of FIGS. 2A, 2B and 2C, the entire rod-like conductor 71 of the central electrode 7 is surrounded by the shield member 8 to apply shielding, it is only necessary to interpose the shield member 8 at least at a portion where the peripheral electrode 6 and the central electrode 7 are adjacent to each other.

Figure 3:
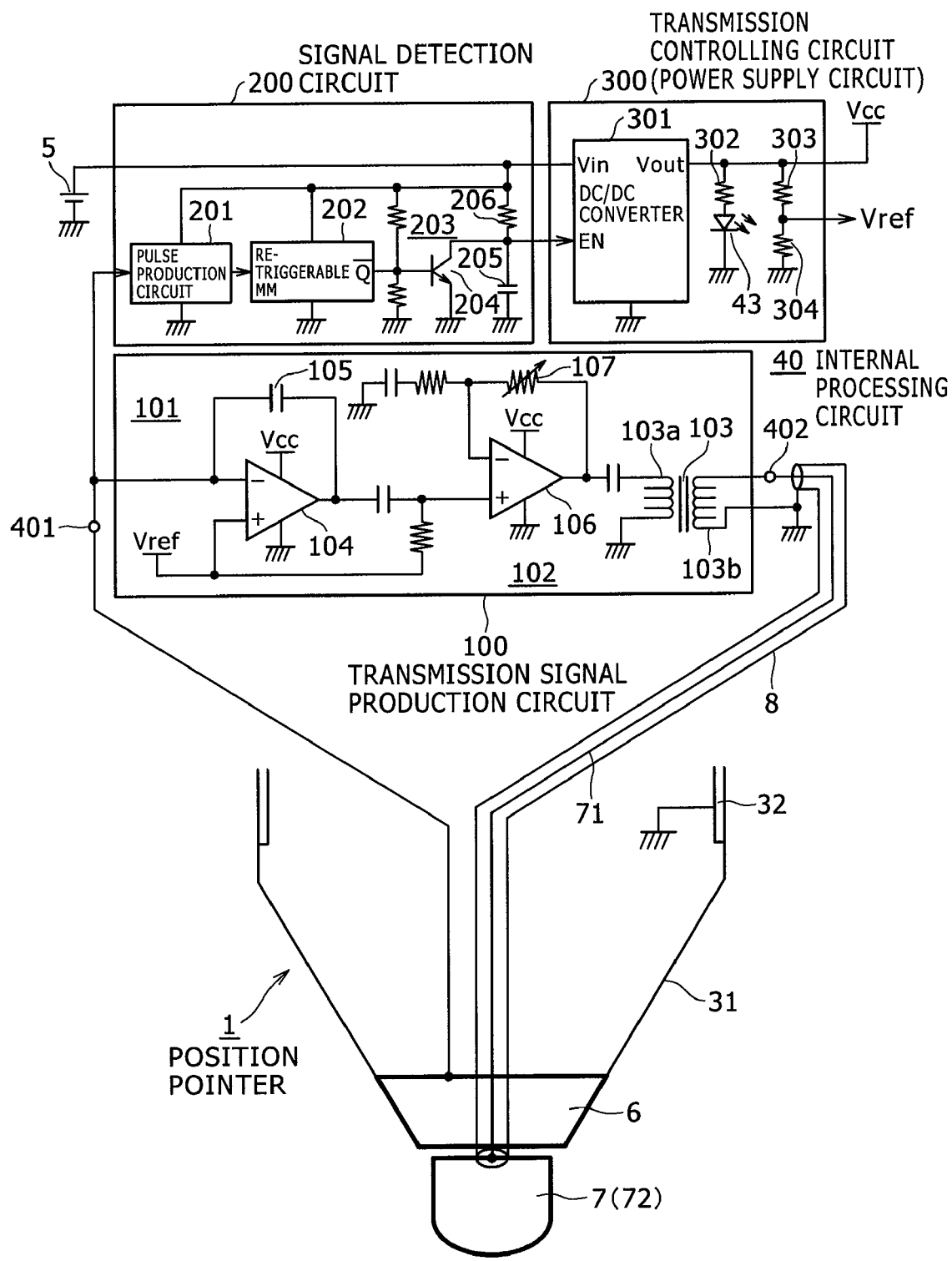
FIG. 3 is a circuit diagram showing an example of a circuit configuration of the first embodiment of the position pointer according to the present invention.

Now, an example of a configuration of the internal processing circuit 40 is described. FIG. 3 is a view showing an example of a circuit configuration of the internal processing circuit 40. As described hereinabove, the internal processing circuit 40 includes the transmission signal production circuit 100, the signal detection circuit 200 and the transmission controlling circuit 300. In the present example, the transmission controlling circuit 300 is configured from a power supply circuit, which controls supply of a power supply voltage to the transmission signal production circuit 100.

As shown in FIG. 3, the peripheral electrode 6 as an example of the first electrode is connected to an input terminal of the transmission signal production circuit 100 and an input terminal of the signal detection circuit 200 through a connection terminal 401 connected to the conductive pattern 42a. Further, a connection terminal 402 connected to the conductive pattern 42b, to which an output terminal of the transmission signal production circuit 100 is connected, is connected to the central electrode 7 as an example of the second electrode.

The transmission controlling circuit (power supply circuit) 300 includes a DC/DC converter 301, and a DC voltage from the battery 5 is supplied to a voltage input terminal Vin of the DC/DC converter 301.

The DC/DC converter 301 includes an enable terminal EN. When the enable terminal EN exhibits a high level, the DC/DC converter 301 is set into a driving state (active state) to produce a power supply voltage +Vcc from the voltage of the battery 5, and outputs +Vcc from a voltage output terminal Vout to supply to the transmission signal production circuit 100. Accordingly, the transmission signal production circuit 100 is set into a driving state to produce a transmission signal, and the transmission signal is sent out from the central electrode 7 to the position detection sensor 2.

On the other hand, when the enable terminal EN is at a low level, the DC/DC converter 301 is set into a non-driving state (sleep state) and stops generating the power supply voltage +Vcc from the voltage output terminal Vout. Consequently, the supply of the power supply voltage +Vcc to the transmission signal production circuit 100 is stopped. Accordingly, the transmission signal production circuit 100 is set into a non-driving state. Thus, no transmission signal is produced, and the transmission operation of a transmission signal from the position pointer 1 is not carried out.

Here, as the DC/DC converter 301, for example, a DC/DC converter "LTC3525" by Linear Technology Corporation is used. In the case of this DC/DC converter "LTC352", the SHDN terminal serves as the enable terminal EN.

In the transmission controlling circuit 300, a DC circuit of a resistor 302 and the LED 43 described hereinabove is connected between the voltage output terminal Vout of the DC/DC converter 301 and the grounding conductor. Further, the voltage output terminal Vout of the DC/DC converter 301 is connected to the grounding conductor through a DC connection of a resistor 303 and another resistor 304, and a reference voltage Vref (=Vcc/2) is output from the node between the resistor 303 and the resistor 304 to the transmission signal production circuit 100.

In this transmission controlling circuit 300, when the enable terminal EN is at a high level and the DC/DC converter 301 is in a driving state, the power supply voltage +Vcc is generated from the voltage output terminal Vout and the LED 43 is turned on. Accordingly, by this turning on of the LED 43, the user is notified of supply of the power supply voltage +Vcc and the reference voltage Vref to the transmission signal production circuit 100. In other words, by the turning on of the LED 43, the user is notified that the transmission signal production circuit 100 is driven to carry out sending a transmission signal from the position pointer 1.

On the other hand, when the enable terminal EN is at the low level and the DC/DC converter 301 is in a non-driving state, since generation of the power supply voltage +Vcc from the voltage output terminal Vout is stopped, the LED 43 is turned off. Accordingly, by this turning off of the LED 43, the user is notified that the supply of the power supply voltage +Vcc and the reference voltage Vref to the transmission signal production circuit 100 is stopped. In other words, by the turning off of the LED 43, the user is notified that the transmission signal production circuit 100 is not driven and that a transmission signal is not sent from the position pointer 1.

The signal detection circuit 200 is a circuit for detecting an AC signal from the position detection sensor 2 and supplies an output signal as a result of the detection as an enable controlling signal to the enable terminal EN of the DC/DC converter 301 of the transmission controlling circuit 300. The voltage from the battery 5 is normally supplied as a driving voltage (power supply voltage) to the signal detection circuit 200.

In the present example, the signal detection circuit 200 is configured of a pulse production circuit 201, a retriggerable monostable multivibrator 202 and an enable controlling signal production circuit 203.

The pulse production circuit 201 is connected at an input terminal thereof to the peripheral electrode 6 through the connection terminal 401. When the position pointer 1 exists on the position detection sensor 2, the peripheral electrode 6 of the position pointer 1 and the position detection sensor 2 are coupled to each other through a capacitance C1 as shown in FIG. 1. As hereinafter described, an AC signal from the position detection sensor 2 is supplied, through the capacitance C1 and the peripheral electrode 6, as a current signal to the connection terminal 401 and input to the pulse production circuit 201.

If an AC signal from the position detection sensor 2 is supplied to the input terminal of the pulse production circuit 201, then the pulse production circuit 201 generates a pulse signal from the AC signal to output as an output signal. However, when the position pointer 1 does not exist on the position detection sensor 2, an AC signal is not received through the peripheral electrode 6. Accordingly, the pulse production circuit 201 does not produce a pulse signal and does not output a pulse signal as the output signal.

The output signal of the pulse production circuit 201 is supplied to a trigger terminal of the retriggerable monostable multivibrator 202. The time constant of the retriggerable monostable multivibrator 202 is set longer than the period of the AC signal generated from the position detection sensor 2. Accordingly, if a pulse signal produced from the AC signal from the position detection sensor 2 is generated as an output signal of the pulse production circuit 201, then the retriggerable monostable multivibrator 202 generates an inverted output signal, which normally has the low level. However, if a pulse is not generated as the output signal of the pulse production circuit 201, then the inverted output signal of the retriggerable monostable multivibrator 202 becomes a signal which always has a high level. The inverted output signal of the retriggerable monostable multivibrator 202 is supplied to the enable controlling signal production circuit 203.

The enable controlling signal production circuit 203 is configured from a switching transistor 204 which receives, at the base thereof, the inverted output signal of the retriggerable monostable multivibrator 202, a capacitor 205 for charging and discharging, and a charging resistor 206. The battery 5 is connected at the positive side terminal thereof to one terminal side of the capacitor 205 for charging and discharging through the charging resistor 206, and the capacitor 205 is connected at the other terminal side thereof to the ground terminal. Further, the node between the resistor 206 and the capacitor 205 is connected to the collector of the switching transistor 204 and also connected to the enable terminal EN of the DC/DC converter 301 of the transmission controlling circuit 300. In other words, a signal obtained at the node between the resistor 206 and the capacitor 205 is a detection output signal of the signal detection circuit 200 and becomes an enable controlling signal for the DC/DC converter 301.

As described hereinabove, when a pulse signal is not generated as the output signal of the pulse production circuit 201, since the inverted output signal of the retriggerable monostable multivibrator 202 is a high level signal, the switching transistor 204 exhibits an on state. Therefore, charging current does not flow to the capacitor 205, and the enable controlling signal at the node between the resistor 206 and the capacitor 205 exhibits a low level. In other words, the enable terminal EN of the DC/DC converter 301 is at a low level, and the DC/DC converter 301 is set to a non-driving state (sleep state) and stops generating the power supply voltage +Vcc from the voltage output terminal Vout. Accordingly, the power supply voltage +Vcc and the reference voltage Vref are not supplied to the transmission signal production circuit 100.

On the other hand, if a pulse signal produced from the AC signal from the position detection sensor is generated as the output signal of the pulse production circuit 201, then the inverted output signal of the retriggerable monostable multivibrator 202 exhibits a low level. Therefore, the switching transistor 204 is turned off. Consequently, charging current flows from the battery 5 to the capacitor 205 through the resistor 206 to charge the capacitor 205. Therefore, the enable controlling signal at the node between the resistor 206 and the capacitor 205 exhibits a high level, and the DC/DC converter 301 is set to a driving state. Thus, the power supply voltage +Vcc is generated from the voltage output terminal Vout and the reference voltage Vref is generated, and then the power supply voltage +Vcc and the reference voltage Vref are supplied to the transmission signal production circuit 100.

In this manner, in the internal processing circuit 40 of the position pointer 1, supply of the power supply voltage from the transmission controlling circuit 300 to the transmission signal production circuit 100 is controlled in accordance with the detection output signal of the signal detection circuit 200, thereby controlling transmission of the transmission signal from the transmission signal production circuit 100.

In this instance, if an AC signal from the position detection sensor 2 is detected by the signal detection circuit 200, then the power supply voltage +Vcc from the transmission controlling circuit 300 is controlled in accordance with the detection output signal of the signal detection circuit 200 so that it is supplied to the transmission signal production circuit 100. If the position pointer 1 is not in an operated state on the position detection sensor 2, then since the signal detection circuit 200 does not detect an AC signal from the position detection sensor 2, the power supply voltage +Vcc is not supplied to the transmission signal production circuit 100, and production and transmission of a transmission signal are not carried out by the transmission signal production circuit 100. Accordingly, when the position pointer 1 is not in an operated state on the position detection sensor 2, power consumption of the battery 5 can be reduced.

If the position pointer 1 is placed on the position detection sensor 2 and operated to point to a position, then an AC signal from the position detection sensor 2 is detected by the signal detection circuit 200 and the power supply voltage +Vcc is automatically supplied from the transmission controlling circuit (power supply circuit) 300 to the transmission signal production circuit 100 to drive the transmission signal production circuit 100. In other words, only when the position pointer 1 is used together with the position detection sensor 2, the power supply voltage +Vcc is automatically supplied to the transmission signal production circuit 100. Accordingly, since power of the battery 5 is consumed only when it is required, significant power saving can be achieved.

Now, the transmission signal production circuit 100 is described. The transmission signal production circuit 100 in the present embodiment forms a signal enhancement processing circuit and is configured from a sense amplifier 101, a signal amplification factor variation circuit 102 and a boosting transformer 103.

The signal enhancement process carried out by this signal enhancement processing circuit includes, in addition to a process of amplifying the signal level of an input signal to a predetermined signal level, a process of transforming the waveform of the input signal or a process of controlling the phase of the input signal. For example, in the case where the input signal is a signal having such a signal waveform as a sine waveform, the signal enhancement process includes a process of increasing the change rate of the signal level of the input signal in a region in which the signal level is low, and decreasing the change rate of the signal level of the input signal in another region in which the signal waveform indicates a maximum value or a minimum value. Or, in the case of an input signal having such a signal waveform as that of a rectangular wave, the signal enhancement process includes a process of increasing the change rate of the signal level of the input signal in a rising edge region or a falling edge region of the signal waveform to make a steep signal waveform, or increasing the amplification level in the region. Also, the signal enhancement process can be applied to carry out such phase control as to compensate for a phase difference with regard to the input signal or as to maintain a predetermined phase difference. In the signal enhancement processing circuit, such signal processes are combined with the amplification process of the signal level described hereinabove or are applied independently of the amplification process of the signal level, to carry out the signal enhancement process.

In the present example, the sense amplifier 101 is configured from an operational amplifier 104, and a capacitor 105 connected between an inverted input terminal and an output terminal of the operational amplifier 104. The operational amplifier 104 is connected at the inverted input terminal thereof to the connection terminal 401 connected to the peripheral electrode 6. Further, to the non-inverted input terminal of the operational amplifier 104, the reference voltage Vref described hereinabove is supplied from the transmission controlling circuit 300.

Accordingly, when the position pointer 1 exists on the position detection sensor 2 and is coupled to the position detection sensor 2 through the capacitance C1, an AC signal from the position detection sensor 2 is supplied through the capacitance C1 and the peripheral electrode 6 as a current signal to the connection terminal 401 and input to the sense amplifier 101. The capacitor 105 is provided to detect the current signal input through the capacitance C1. In accordance with various embodiments of the present invention, the AC signal may have any waveform. An AC signal of any waveform such as a rectangular wave signal or a sine wave signal can be input.

The sense amplifier 101 inverts the phase of the AC signal, which is input as a current signal through the connection terminal 401, and outputs a resulting signal to the signal amplification factor variation circuit 102.

The signal amplification factor variation circuit 102 is configured from an operational amplifier 106, and a variable resistor 107 connected between the inverted input terminal and the output terminal of the operational amplifier 106. The resistance value of the variable resistor 107 may be variably controlled by the user, who manually and slidably moves the sliding operation section 44 shown in FIG. 2C. By manually and variably setting the resistance value of the variable resistor 107, the amplification factor of the signal amplification factor variation circuit 102 may be variably set, and as a result, the signal detection sensitivity of the position pointer 1 may be controlled.

The AC signal amplified by the signal amplification factor variation circuit 102 is supplied to a primary coil 103*a* of the boosting transformer 103. The ratio between the turn number n1 of the primary coil 103*a* and the turn number n2 of a secondary coil 103*b* of the boosting transformer 103 is set such that the turn number n2 of the secondary coil 103*b* is greater than the turn number n1 of the primary coil 103*a* (n1<n2) like, for example, n1:n2=1:10. Accordingly, the amplitude of an output signal of the signal amplification factor variation circuit 102 is multiplied in accordance with the ratio in turn numbers so that an AC signal (voltage signal) of an increased amplitude is obtained on the secondary coil 103b side of the boosting transformer 103.

The secondary coil 103b of the boosting transformer 103 is connected at one end thereof to the connection terminal 402. The connection terminal 402 is connected to the rod-like conductor 71 of the central electrode 7, which is shielded by the shield member 8. The secondary coil 103b of the boosting transformer 103 is connected at the other end thereof to the grounding conductor of the printed wiring board 41. Accordingly, the output signal converted into an AC signal voltage of an increased amplitude by the transmission signal production circuit 100 is supplied to the central electrode 7 through the connection terminal 402.

Accordingly, if the position pointer 1 exists on the position detection sensor 2 and the peripheral electrode 6 of the position pointer 1 and the position detection sensor 2 are coupled to each other through the capacitance C1, then the AC signal is fed back from the position pointer 1 to the position detection sensor 2 through the central electrode 7 of the position pointer 1.

Now, the position detection sensor 2 of the capacitance type of the present example is described. The position detection sensor 2 of the capacitance type of the present example has sensor electrodes configured from input electrodes and output electrodes and is configured as a position detection sensor of the mutual capacitance type, which detects a variation in capacitive coupling at a point touched by the position pointer 1.

Figure 4:
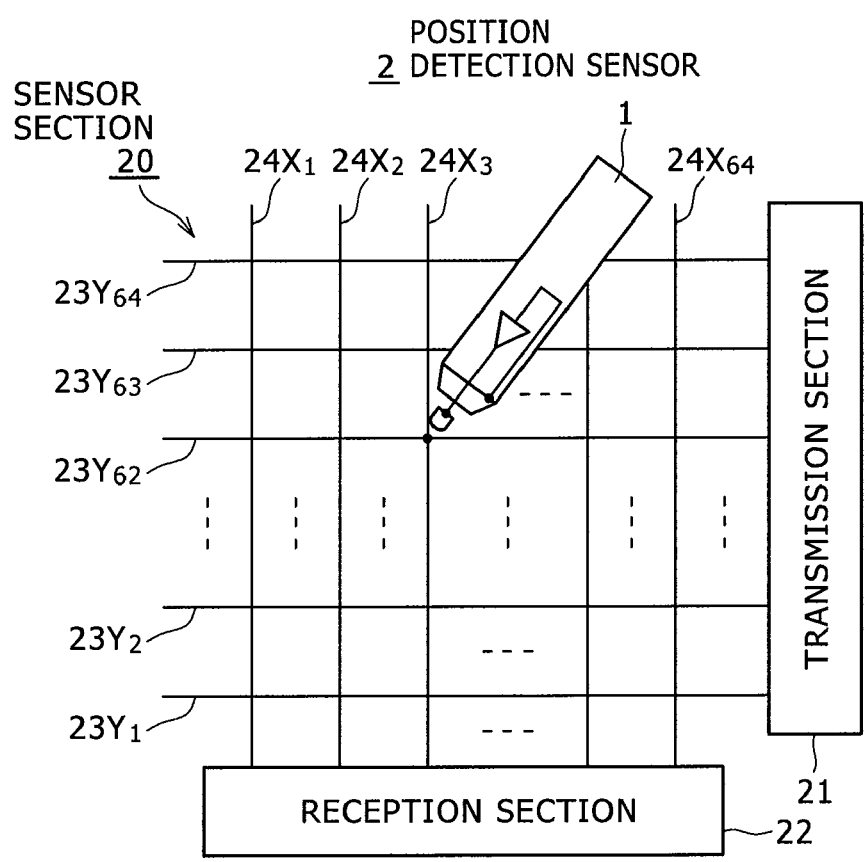
FIG. 4 is a view illustrating an example of a position detection sensor, with which the position pointer of the present invention may be used.

In particular, as shown in FIG. 4, the position detection sensor 2 of the present example is configured from a sensor section 20, a transmission section 21 and a reception section 22. The sensor section 20 includes: a plurality of, 64 in the present example, linear transmission conductors $23Y_1$, $23Y_2, \ldots, 23Y_{64}$ extending in a transverse direction (X axis direction) of the pointing inputting surface, on which the position pointer 1 points to a position; and a plurality of, 64 in the present example, reception conductors $24X_1$, $24X_2, \ldots, 24X_{64}$ extending in a vertical direction (Y axis direction) of the pointing inputting surface perpendicularly to the transmission conductors $23Y_1$ to $23Y_{64}$. The plural transmission conductors $23Y_1$ to $23Y_{64}$ are disposed at equal distances in the Y axis direction and connected to the transmission section 21. The plural reception conductors $24X_1$ to $24X_{64}$ are disposed at equal distances in the X axis direction and connected to the reception section 22.

It is to be noted that, in the description of the transmission conductors in this specification, when there is no necessity to distinguish the 64 transmission conductors $23Y_1$ to $23Y_{64}$ from one another, each of them is referred to as transmission conductor 23Y. Similarly, in the description of the reception conductors, when there is no necessity to distinguish the 64 reception conductors $24X_1$ to $24X_{64}$ from one another, each of them is referred to as reception conductor 24X.

The plural transmission conductors 23Y are formed, for example, on the lower side face of a substrate. The plural reception conductors 24X are formed on the upper side face of the substrate. Accordingly, the plural transmission conductors 23Y and the plural reception conductors 24X are disposed in a determined spaced relationship from each other corresponding to a determined thickness and have an arrangement relationship perpendicular to each other such that a plurality of intersecting points (cross points) are formed. At each of the cross points, a transmission conductor 23Y and a reception conductor 24X are considered to be coupled to each other through a determined capacitor.

The transmission section 21 supplies a determined AC signal to the transmission conductor 23Y. In this instance, the transmission section 21 may successively supply the same AC signal to the plural transmission conductors $23Y_1$, $23Y_2, \ldots, 23Y_{64}$ while switching them over one by one, or may simultaneously supply a plurality of AC signals different from each other to the plural transmission conductors $23Y_1, 23Y_2, \ldots, 23Y_{64}$. Or, the plural transmission conductors $23Y_1, 23Y_2, \ldots, 23Y_{64}$ may be divided into a plurality of groups such that different AC signals from each other are supplied to the different groups, respectively.

The reception section 22 detects a signal component of an AC signal supplied to a transmission conductor 23Y when the AC signal is transmitted to each of the reception conductors $24X_1, 24X_2, \ldots, 24X_{64}$ through a determined capacitance. If the capacitive coupling between a transmission conductor 23Y and a reception conductor 24X is equal at all cross points, then when the position pointer 1 does not exist on the sensor section 20, a reception signal of a predetermined level is detected from all of the reception conductors $24X_1, 24X_2, \ldots, 24X_{64}$ of the sensor section 20 by the reception section 22.

On the other hand, if the position pointer 1 points to a determined position of the sensor section 20, then the transmission conductor 23Y and the reception conductor 24X which form the cross point at the pointed position are capacitively coupled with the position pointer 1. In particular, since the capacitance is varied due to the position pointer 1, the reception signal level obtained from the reception conductor 24X at the cross point at which the position pointer 1 exists varies in comparison with the reception signal level at any other cross point.

The reception section 22 detects the reception conductor 24X with regard to which a variation in the reception signal level is detected from among the plural reception conductors $24X_1, 24X_2, \ldots, 24X_{64}$ to detect the position of the position pointer 1. Then, the control section of the position detection sensor 2, not shown, detects the transmission conductor 23Y to which the AC signal is supplied from the transmission section 21, and the reception conductor 24X which exhibits a variation in the reception signal level detected by the reception section 22, to thereby detect the cross point with which the position pointer 1 is in contact.

Also, when a finger, as opposed to the position pointer 1, approaches or touches the sensor section 20 to point to a position, the position detection sensor 2 detects the cross point at the position, which is pointed to by the finger, based on a similar principle. In this instance, a portion of the AC signal supplied to the transmission conductor 23Y flows to the ground through the finger and the body of the user. Therefore, the reception signal level of the reception conductor 24X, which forms the cross point at which the finger exists, varies. The reception section 22 detects the variation in the reception signal level to detect the reception conductor 24X, which forms the cross point at which the finger exists.

Also in the case where the position pointer has a stylus form, the position detection sensor 2 can carry out detection of a pointed position of the sensor section 20 in a similar manner as in the principle of position detection of a finger. However, in the case of a position pointer of a stylus form, since the contact area with the position detection pointer 2 is typically not so great as that in the case of a finger, the coupling capacitance is low and the detection sensitivity by the position detection sensor 2 may be low.

In contrast, as described below, the position pointer 1 of the present embodiment has high affinity with the position detection sensor 2, has high versatility and ensures a determined waveform correlation between an input signal and an output signal. Thus, position detection on the sensor section 20 can be achieved with a high sensitivity.

In particular, in the case where the position pointer 1 of the present embodiment is positioned in the proximity of or contacted with the sensor section 20 of the position detection sensor 2 to point to a position as seen in FIG. 1, the peripheral electrode 6 and the sensor section 20 are coupled to each other through the capacitance C1. Then, the AC signal supplied to the transmission conductor 23Y is input, via the capacitance C1 and the peripheral electrode 6, as a current signal through the connection terminal 401 to the transmission signal production circuit 100.

The AC signal (current signal) input to the transmission signal production circuit 100 is inverted in phase by the sense amplifier 101 and then amplified by the signal amplification factor variation circuit 102, whereafter it is boosted (multiplied) to be enhanced by the boosting transformer 103 and supplied as a voltage signal to the central electrode 7 through the connection terminal 402. In particular, the AC signal input from the sensor section 20 through the peripheral electrode 6 to the transmission signal production circuit 100 is inverted in phase, formed into a signal of a large amplitude, and then fed back to the sensor section 20 through the central electrode 7.

In this instance, since the AC signal fed back to the sensor section 20 of the position detection sensor 2 from the central electrode 7 of the position pointer 1 is an enhanced signal of a phase opposite to that of the AC signal supplied to the transmission conductor 23Y, the position pointer 1 functions so as to increase the variation of the AC signal in the reception signal of the reception conductor 24X. Therefore, the position detection sensor 2 can detect the position pointed to by the position pointer 1 with a high sensitivity. It is to be noted that, where the ground of the position pointer 1 is connected to the human body, the detection operation is further stabilized. In particular, in the present embodiment, the housing 3 of the position pointer 1 is covered with the conductor portion 32 connected to the grounding conductor of the printed wiring board 41, on which the internal processing circuit 40 is formed. Therefore, since the AC signal supplied to the transmission conductor 23Y in the position detection sensor 2 flows to the ground through the position pointer 1 and the body of the user, further stabilization of the signal detection operation can be achieved.

Where the voltage at the transmission conductors 23Y of the sensor section 20 of the position detection sensor 2 is represented by V, the voltage at the central electrode 7 of the position pointer 1 in the present embodiment is represented by e, and where the capacitance between the peripheral electrode 6 and the central electrode 7 is represented by C2 (refer to FIG. 1), then a relationship can be established as follows.

$$e \leq C1/C2 \cdot V$$

Therefore, it is advantageous to set the capacitance C2 between the peripheral electrode 6 and the central electrode 7 as low as possible to obtain a high voltage e for the central electrode 7.

To this end, in the position pointer 1 of the present embodiment, the shield member 8 is interposed between the peripheral electrode 6 and the central electrode 7 to minimize the coupling between them. Accordingly, in the position pointer 1 of the present embodiment, due to the interposition of the shield member 8, the capacitance C2 between the peripheral electrode 6 and the central electrode 7 is reduced, and consequently, the voltage e can be increased and the sensitivity can be efficiently enhanced. Further accordingly, power consumption can be reduced.

Further, in the position pointer 1 of the present embodiment, the detection sensitivity of the pointed position of the position pointer 1 on the position detection sensor 2 can be adjusted by the user manually adjusting the sliding operation section 44 to vary the resistance value of the variable resistor 107, to thereby variably set the amplification factor of the signal amplification factor variation circuit 102.

For example, in a state in which the central electrode 7 of the position pointer 1 lightly touches the surface of the sensor section 20 of the position detection sensor 2, the contact area between the elastic protective conductor 72 at the tip end of the central electrode 7 and the sensor section 20 is small. However, by manually adjusting the sliding operation section 44 to increase the amplification factor of the signal amplification factor variation circuit 102, even when the touch is light, the position detection sensor 2 can detect the position pointer 1 with a high sensitivity.

On the contrary, in another state in which the central electrode 7 of the position pointer 1 forcefully touches the surface of the sensor section 20 of the position detection sensor 2, the contact area between the elastic protective conductor 72 at the tip end of the central electrode 7 and the sensor section 20 is great. In this instance, by manually adjusting the sliding operation section 44 to decrease the amplification factor of the signal amplification factor variation circuit 102, even when the touch is strong, the position detection sensor 2 can stably detect the touch as a touch applied with an appropriate level of force.

It is to be noted that, while the signal amplification factor variation circuit 102 of the signal enhancement processing circuit in the embodiment described above is configured such that the amplification factor can be varied continuously by the variable resistor 107, it may otherwise be configured such that the amplification factor is varied stepwise by switching among a plurality of resistors having different resistance values, by means of a slide switch.

In this manner, while in the first embodiment described above, the position pointer 1 enhances an AC signal from the position detection sensor 2 and feeds the enhanced AC signal back to the position detection sensor 2, the signal enhancement of and the feedback signal transmission to the position detection sensor 2 of the AC signal can be carried out in a state in which the position pointer 1 is being operated on the position detection sensor 2, and thus power saving can be achieved.

It is to be noted that, in the first embodiment described above, a power supply switch which can be manually switched on and off by the user may be provided between the battery 5 and the voltage input terminal Vin of the DC/DC converter 301 of the transmission controlling circuit (power supply circuit) 300. In this instance, only when the power supply switch is on, the DC voltage is supplied from the battery 5 also to the signal detection circuit 200, and thus further power saving can be achieved. This similarly applies also to position pointers of the other embodiments hereinafter described.

Further, the position pointer 1 of the first embodiment described above is configured such that the peripheral electrode 6 serves as the first electrode for receiving an AC signal from the position detection sensor 2 and the central electrode 7 serves as the second electrode for feeding an enhanced output AC signal back to the position detection sensor 2. However, the first electrode for receiving an AC signal from the position detection sensor 2 may be set as the central electrode 7 while the second electrode for feeding an enhanced AC signal back to the position detection sensor 2 is set as the peripheral electrode 6. This also similarly applies to the position pointers of the other embodiments hereinafter described.

Second Embodiment

In the first embodiment described above, the signal detection circuit 200 detects an AC signal, received from the position detection sensor 2 through the peripheral electrode 6 and through the connection terminal 401. Therefore, in the pulse production circuit 201 of the signal detection circuit 200, although an example of a detailed configuration of a circuit is omitted, it is necessary to provide a sense amplifier similar to the sense amplifier 101 at the first stage of the transmission signal production circuit 100, and there is a possibility that the configuration may be complicated.

Figure 5:
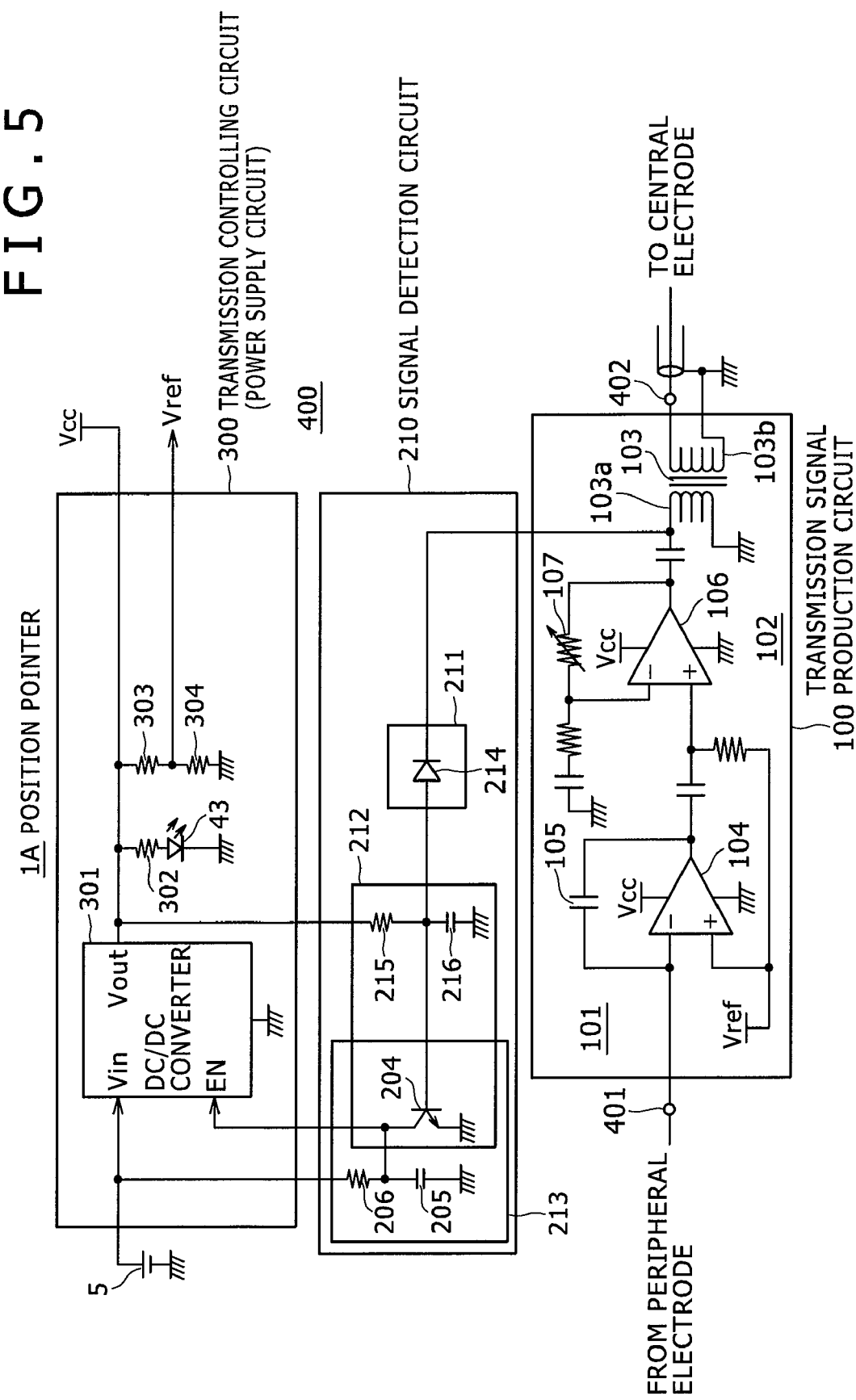
FIG. 5 is a circuit diagram showing an example of a circuit configuration of a second embodiment of the position pointer according to the present invention.

The second embodiment is an example in which the configuration of the signal detection circuit 200 of the position pointer 1 can be further simplified. FIG. 5 shows a circuit example of an internal processing circuit 400 of a position pointer 1A according to the second embodiment. Referring to FIG. 5, the same elements to those of the internal processing circuit 40 of the position pointer 1 of the first embodiment shown in FIG. 3 are denoted by the same reference symbols, and detailed descriptions of the same are omitted. It is to be noted that the position pointer 1A of the second embodiment has a structural configuration similar to that of the position pointer 1 of the first embodiment shown in FIGS. 2A, 2B and 2C.

In the second embodiment, the transmission signal production circuit 100 and the transmission controlling circuit (power supply circuit) 300 include components similar to those in the first embodiment. However, instead of an AC signal received by the peripheral electrode 6 through the connection terminal 401 but, for example, an output signal of the signal amplification factor variation circuit 102 of the transmission signal production circuit 100 is supplied to a signal detection circuit 210 in the second embodiment.

Accordingly, a pulse production circuit 211 of the signal detection circuit 210 receives, as an input signal thereto, a signal detected and amplified by the sense amplifier 101 of the transmission signal production circuit 100. Consequently, a sense amplifier having a configuration similar to that of the sense amplifier 101 is not required, and the circuit configuration can be simplified in comparison with the pulse production circuit 201 of the signal detection circuit 200 in the first embodiment.

It is noted that, in the case of the present second embodiment, for an AC signal from the position detection sensor 2 to be detected by the signal detection circuit 210, not only the signal detection circuit 210 but also the transmission signal production circuit 100 must be in an operative state.

Therefore, in the second embodiment, in order to detect whether or not an AC signal from the position detection sensor 2 is detected, the power supply voltage +Vcc and the reference voltage Vref are intermittently supplied from the transmission controlling circuit (power supply circuit) 300 to the transmission signal production circuit 100 to control the transmission signal production circuit 100 so that the transmission signal production circuit 100 is driven intermittently. The signal detection circuit 210 in the second embodiment includes a circuit configuration for the control just described. It is to be noted that the DC voltage from the battery 5 is always supplied as a driving power supply voltage to the signal detection circuit 210.

As shown in FIG. 5, the signal detection circuit 210 includes a pulse production circuit 211, an intermittent driving controlling circuit 212 and an enable controlling signal production circuit 213. The enable controlling signal production circuit 213 is configured from a switching transistor 204, a capacitor 205 and a resistor 206 and is configured similarly to the enable controlling signal production circuit 203 in the first embodiment described hereinabove.

The pulse production circuit 211 in the present example is configured from a diode 214. The diode 214 is connected at the cathode thereof to the primary coil 103a of the boosting transformer 103, which forms the transmission signal production circuit 100, and at the anode thereof to the base of the switching transistor 204.

The intermittent driving controlling circuit 212 is configured from a resistor 215, a capacitor 216 and the switching transistor 204. The DC/DC converter 301 of the transmission controlling circuit 300 is connected at the voltage output terminal Vout thereof to the grounding conductor through a series circuit of the resistor 215 and the capacitor 216, and the node between the resistor 215 and the capacitor 216 is connected to the node between the switching transistor 204 and the diode 214. The resistor 215 and the capacitor 216 form a time constant circuit.

The intermittent driving controlling circuit 212 has a control function to intermittently drive the transmission signal production circuit 100, and has a function in place of the function of the retriggerable monostable multivibrator 202 in the first embodiment.

In FIG. 5, the configuration of the other portions, that is, the configuration of the transmission signal production circuit 100 and the transmission controlling circuit 300, is similar to that of the internal processing circuit 40 in the first embodiment.

With the configuration described above, when the position pointer 1A of the second embodiment does not exist on the position detection sensor 2 and accordingly an AC signal from the position detection sensor 2 is not received, since an AC signal is not output from the transmission signal production circuit 100, the diode 214 which forms the pulse production circuit 211 is set to an off state. Consequently, a pulse signal is not produced through the pulse production circuit 211.

On the other hand, until when the switching transistor 204 is turned on, charging current is supplied from the battery 5 to the capacitor 205 through the resistor 206 to thereby charge the capacitor 205. Therefore, an enable controlling signal obtained at the node between the resistor 206 and the capacitor 205 switches to the high level after a lapse of a determined interval of time, which depends upon the time constant which in turn depends upon the resistor 206 and the capacitor 205. Consequently, the signal level at the enable terminal EN of the DC/DC converter 301 becomes the high level and the DC/DC converter 301 is set to a driving state, and a power supply voltage +Vcc is generated from the voltage output terminal Vout and supplied to the transmission signal production circuit 100.

When the DC/DC converter 301 is set to a driving state and the power supply voltage +Vcc is generated from the voltage output terminal Vout, charging current flows to the capacitor 216 through the resistor 215 to charge the capacitor 216. Then, after a determined interval of time, which depends upon the time constant which in turn depends upon the resistor 215 and the capacitor 216, has lapsed after the power supply voltage +Vcc is generated from the voltage output terminal Vout, the potential at the node between the capacitor 216 and the resistor 215 rises until it reaches a potential at which the switching transistor 204 is rendered conductive to turn on the switching transistor 204.

When the switching transistor 204 is turned on, the charge of the capacitor 205 is discharged through the switching transistor 204, and consequently, the signal level of the enable controlling signal obtained at the node between the resistor 206 and the capacitor 205 changes to the low level. Accordingly, the signal level at the enable terminal EN of the DC/DC converter 301 becomes the low level, and the DC/DC converter 301 is set to a non-driving state (sleep state) and stops the generation of the power supply voltage +Vcc from the voltage output terminal Vout. Thus, the power supply voltage +Vcc and the reference voltage Vref are not supplied any more to the transmission signal production circuit 100.

After the generation of the power supply voltage +Vcc from the voltage output terminal Vout of the DC/DC converter 301 stops, the base potential of the switching transistor 204 becomes lower, and consequently, the switching transistor 204 is turned off. After the switching transistor 204 turns off, charging current is supplied from the battery 5 to the capacitor 205 through the resistor 206 to thereby charge the capacitor 205, and after a predetermined interval of time which depends upon the time constant which in turn depends upon the resistor 206 and the capacitor 205 elapses, the enable controlling signal obtained at the node between the resistor 206 and the capacitor 205 changes to the high level, and then the DC/DC converter 301 is set to a driving state.

In the case where a pulse signal is not generated by the pulse production circuit 211 because an AC signal is not received from the position detection sensor 2 as described above, the DC/DC converter 301 is driven intermittently by the enable controlling signal production circuit 213 of the signal detection circuit 210. In particular, the DC/DC converter 301 exhibits a state in which it generates the power supply voltage +Vcc from the voltage output terminal Vout for a predetermined period of time corresponding to the time constant, which depends upon the resistor 215 and the capacitor 216. Further, during a determined period of time corresponding to the time constant, which depends upon the resistor 206 and the capacitor 205, the DC/DC converter 301 exhibits a state in which it stops generation of the power supply voltage +Vcc from the voltage output terminal Vout. The two states described above are alternately repeated.

Then, if an AC signal from the position detection sensor 2 is received through the peripheral electrode 6 when the power supply voltage +Vcc is generated from the voltage output terminal Vout of the DC/DC converter 301 and when the transmission signal production circuit 100 is in a driving state, then the transmission signal production circuit 100 carries out a signal enhancement process for the AC signal in a manner as described hereinabove. Then, the enhanced AC signal from the transmission signal production circuit 100 is supplied to the central electrode 7 and supplied to the signal detection circuit 210.

In the signal detection circuit 210, the diode 214 that forms the pulse production circuit 211 is turned on and off based on the AC signal from the transmission signal production circuit 100. In response to the turning on and off of the diode 214, a pulse signal is produced by the pulse production circuit 211. Then, within a period during which the diode 214 is on, the charge of the capacitor 216 is discharged through the diode 214, and consequently, the potential at the node between the resistor 215 and the capacitor 216 does not reach a state in which the potential rises to a potential at which the switching transistor 204 is turned on. Therefore, the switching transistor 204 remains in the off state. Consequently, the enable controlling signal obtained at the node between the resistor 206 and the capacitor 205 remains in the high level, and the DC/DC converter 301 maintains the state in which the power supply voltage +Vcc is generated from the voltage output terminal Vout thereof.

Then, if the reception of the AC signal from the position detection sensor 2 through the peripheral electrode 6 stops, then the diode 214 that forms the pulse production circuit 211 is turned off. Therefore, charging current flows to the capacitor 216 through the resistor 215, and after a lapse of the determined interval of time which depends upon the time constant which in turn depends upon the resistor 215 and the capacitor 216, the switching transistor 204 is turned on and the signal level of the enable controlling signal changes to the low level. Accordingly, the signal level of the enable terminal EN of the DC/DC converter 301 becomes the low level, and the DC/DC converter 301 is set into a non-driving state (sleep state).

Thereafter, until after the position pointer 1A enters a state in which it receives an AC signal from the position detection sensor 2, the DC/DC converter 301 is controlled to be intermittently driven by the operation described hereinabove of the signal detection circuit 210.

In this manner, with the position pointer 1A of the second embodiment, the configuration of the signal detection circuit 210 can be simplified. Further, in the state in which the position pointer 1A is not used together with the position detection sensor 2, the transmission signal production circuit 100 is driven intermittently, and therefore the power consumption of the battery 5 can be reduced and power saving can be achieved.

It is to be noted that, also in the present second embodiment, a power supply switch which can be manually turned on and off by the user may be provided between the battery 5 and the voltage input terminal Vin of the DC/DC converter 301 of the transmission controlling circuit (power supply circuit) 300. If the configuration just described is adopted, then only when the power supply switch is on, the DC voltage from the battery 5 is supplied also to the signal detection circuit 210. In combination with the intermittent supply of power to the transmission signal production circuit 100, such arrangement leads to further power saving.

Third Embodiment

In the first and second embodiments described hereinabove, the position pointers 1 and 1A include the battery 5 as a driving power supply. Therefore, when the battery 5 is exhausted, it must be exchanged, which is cumbersome. Further, if the battery 5 is built in, the weight of the position pointer increases, resulting in the possibility that the position pointer's operability may be deteriorated. The third embodiment is an example which solves the problem just described, by using a power storage circuit including a capacitor in place of a battery.

Figure 6:
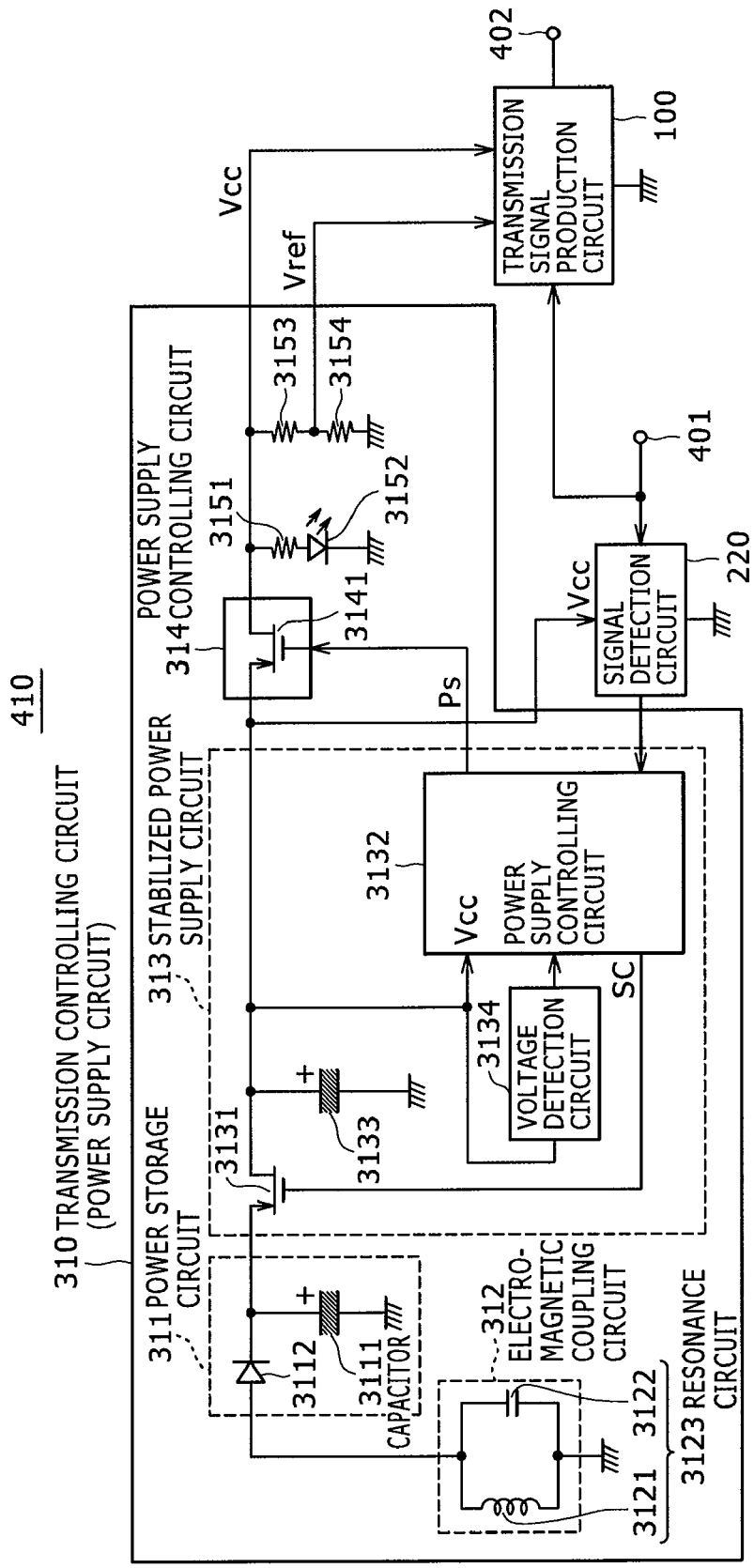
FIG. 6 is a circuit diagram showing an example of a circuit configuration of a third embodiment of the position pointer according to the present invention.

FIG. 6 is a circuit diagram showing an example of an internal processing circuit 410 of a position pointer 1B of the present third embodiment, and the internal processing circuit 410 is configured from the transmission signal production circuit 100, a signal detection circuit 220 and a transmission controlling circuit 310. The transmission signal production circuit 100 has the same configuration as that of the internal processing circuit 40 in the first embodiment. Further, although the position pointer 1B of the present third embodiment has a structural configuration substantially similar to that of the position pointer 1 of the first embodiment shown in FIGS. 2A, 2B and 2C, there is a small difference in a portion of the housing 3 as hereinafter described.

Figure 7:
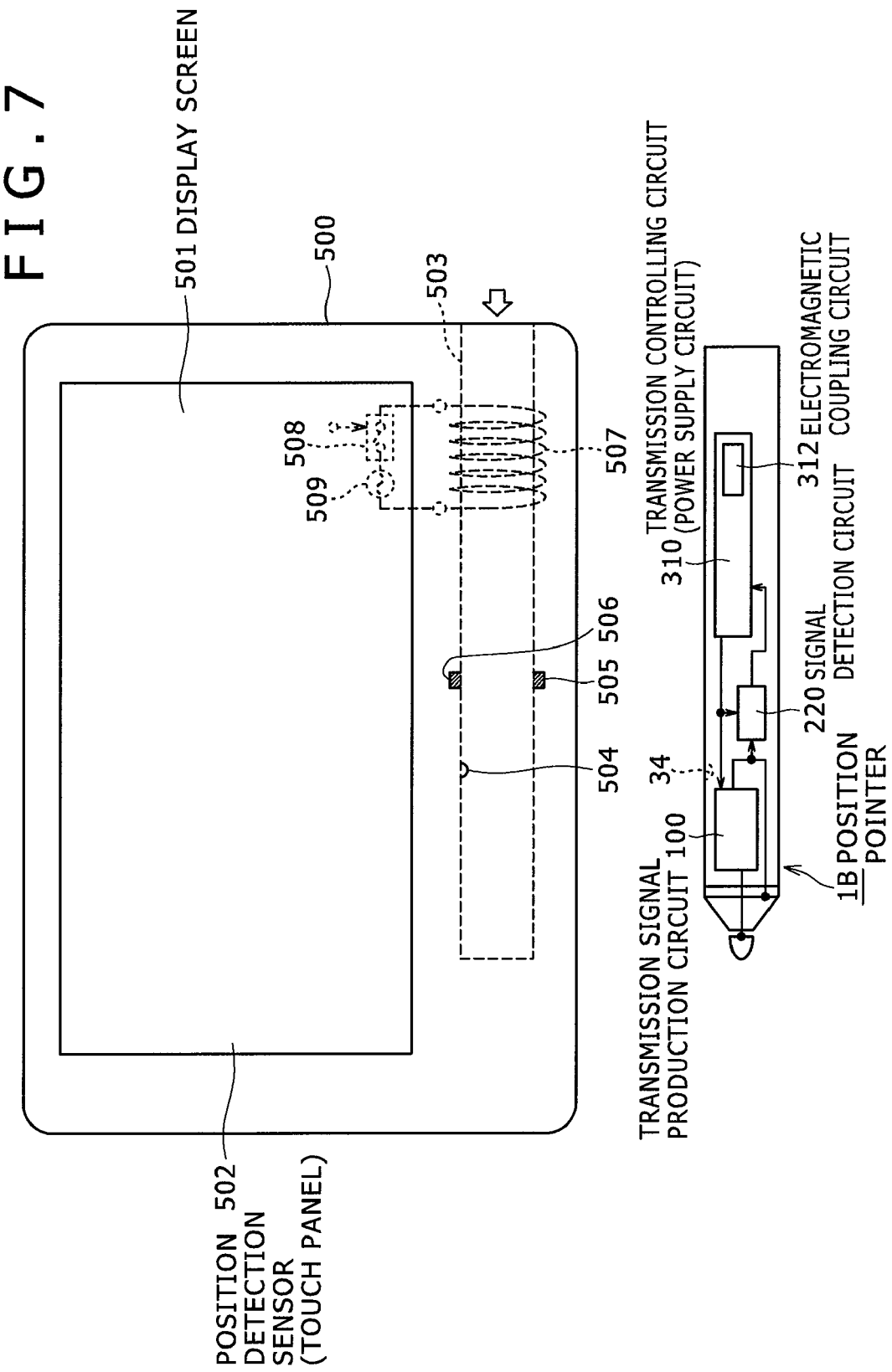
FIG. 7 is a view illustrating the third embodiment of the position pointer according to the present invention together with a position detection sensor.

The position pointer 1B of the third embodiment is an example, which may be used together with a portable terminal 500 that incorporates a position detection sensor, as shown in FIG. 7. The portable terminal incorporating a position detection sensor 500 in this example is configured such that it includes a housing of a flattened shape and a display screen 501, which occupies a large part of one surface face side of the housing. In the portable terminal incorporating a position detection sensor 500, a transparent position detection sensor (touch panel) 502 is disposed on the display screen 501. The position detection sensor 502 has a configuration similar to that of the position detection sensor 2 described hereinabove and can detect a pointed position input by the position pointer 1B.

The portable terminal incorporating a position detection sensor 500 includes a tubular accommodation section 503 in the housing thereof to receive the position pointer 1B therein. At a determined position in the accommodation section 503, a spherical protrusion 504 is provided to accommodatingly position the position pointer 1B inserted in the accommodation section 503. This spherical protrusion 504 is configured such that it can be elastically provided on a wall face of the accommodation section 503.

A fitting recessed portion 34 is formed on a circumferential outer surface of the rod-shaped housing 3 of the position pointer 1B, to fittingly engage with the spherical protrusion 504, as shown in FIG. 7. If the position pointer 1B is inserted into the accommodation section 503, then the spherical protrusion 504 is pushed by the housing 3 of the position pointer 1B and deformed elastically against the wall face. When the spherical protrusion 504 comes to the position of the fitting recessed portion 34 of the position pointer 1B, then the spherical protrusion 504 is fitted into the fitting recessed portion 34, whereupon the position pointer 1B is positioned in the accommodation section 503.

Further, an accommodation sensor for detecting whether or not the position pointer 1B is accommodated is provided in the accommodation section 503. In the example of FIG. 7, the accommodation sensor is configured from a light emitting element 505 and a light receiving element 506. The light emitting element 505 and the light receiving element 506 are provided at positions on the inner wall face of the accommodation section 503 opposing each other such that light from the light emitting element 505 is blocked by the position pointer 1B accommodated in the accommodation section 503.

When the position pointer 1B is not accommodated in the accommodation section 503, light from the light emitting element 505 can be received by the light receiving element 506. On the other hand, when the position pointer 1B is accommodated in the accommodation section 503, then light from the light emitting element 505 is blocked by the position pointer 1B and does not reach the light receiving element 506. The portable terminal incorporating a position detection sensor 500 monitors an output of the light receiving element 506 that indicates reception of light from the light emitting element 505, to thereby detect whether or not the position pointer 1B is accommodated in the accommodation section 503.

Further, in the portable terminal incorporating a position detection sensor 500 of the present example, a magnetic field generating coil 507 for supplying an alternating magnetic field to the position pointer 1B is provided at a determined position in the accommodation section 503. An oscillator 509 is connected between the opposite ends of the magnetic field generating coil 507 through a switch circuit 508, and an AC signal of a predetermined frequency is supplied to the coil 507. When the portable terminal incorporating a position detection sensor 500 detects from a light reception output of the light receiving element 506 that the position pointer 1B is accommodated in the accommodation section 503, the switch circuit 508 is turned on to supply an AC signal from the oscillator 509 to the magnetic field generating coil 507.

The signal detection circuit 220 in the present third embodiment can be configured, though not shown, for example, from the pulse production circuit 201 and the retriggerable monostable multivibrator 202 of the signal detection circuit 200 shown in FIG. 3.

As shown in FIG. 6, while the transmission controlling circuit 310 of the internal processing circuit 410 of the position pointer 1B of the present third embodiment has a configuration of a power supply circuit similar to that in the above-described embodiments, it includes a power storage circuit 311, in which a capacitor 3111, for example, an electrical double layer capacitor, is used in place of the battery. The transmission controlling circuit 310 further includes an electromagnetic coupling circuit 312, a stabilized power supply circuit 313 and a power supply controlling circuit 314.

The electromagnetic coupling circuit 312 is configured from a resonance circuit 3123 formed of a coil 3121 and a capacitor 3122. The resonance circuit 3123 has a resonance frequency equal to the frequency of an AC signal supplied to the magnetic field generating coil 507 of the portable terminal incorporating a position detection sensor 500. Further, the electromagnetic coupling circuit 312 in the position pointer 1B is so positioned as to receive the alternating magnetic field from the magnetic field generating coil 507, when the position pointer 1B is accommodated in the accommodation section 503 of the portable terminal incorporating a position detection sensor 500, as shown in FIG. 7.

The electromagnetic coupling circuit 312 resonates in response to an alternating magnetic field received from the magnetic field generating coil 507 to produce induced current. This induced current is rectified by a diode 3112 of the power storage circuit 311, and the capacitor 3111 is charged with the rectified signal.

In this manner, in the present third embodiment, when the position pointer 1B is accommodated in the accommodation section 503 of the portable terminal incorporating a position detection sensor 500, the capacitor 3111 is charged to store electric charge in the power storage circuit 311. Then, the hold voltage of the capacitor 3111 is supplied to the stabilized power supply circuit 313.

The stabilized power supply circuit 313 is configured from an FET (Field Effect Transistor) 3131 for PWM (Pulse Width Modulation) control; a power supply controlling circuit 3132 formed of a processor; a stabilizing capacitor 3133; and a voltage detection circuit 3134.

The voltage held in the capacitor 3111 of the power storage circuit 311 is transferred to the voltage stabilizing capacitor 3133 in response to turning on/off of the FET 3131. The power supply controlling circuit 3132 supplies a rectangular wave signal SC of a fixed period, whose duty ratio is controlled in such a manner as hereinafter described, as a switching signal to the gate of the FET 3131. The FET 3131 is turned on and off in response to the rectangular wave signal SC, to thereby PWM-control the hold voltage of the capacitor 3111, and the voltage of a result of the PWM control is converted into a smoothed voltage by the voltage stabilizing capacitor 3133. Then, the hold voltage of the voltage stabilizing capacitor 3133 is supplied as a driving power supply voltage to the power supply controlling circuit 3132.

The voltage detection circuit 3134 detects the value of the hold voltage of the voltage stabilizing capacitor 3133 and supplies the detected voltage value to the power supply controlling circuit 3132. The power supply controlling circuit 3132 controls the duty ratio of the rectangular wave signal SC to be supplied to the gate of the FET 3131 so that the detected voltage value of the voltage detection circuit 3134 becomes the power supply voltage +Vcc that is determined in advance.

While the stabilized power supply voltage +Vcc is generated by the stabilized power supply circuit 313 in such a manner as described above, the power supply voltage +Vcc is supplied to the transmission signal production circuit 100 through the power supply controlling circuit 314. In the example of FIG. 6, the power supply controlling circuit 314 is configured from a FET 3141, and a power supply controlling signal Ps is supplied from the power supply controlling circuit 3132 to the gate of the FET 3141.

The power supply controlling circuit 3132 produces a power supply controlling signal Ps to be supplied to the power supply controlling circuit 314 based on the signal detection output from the signal detection circuit 220. In particular, when the signal detection output from the signal detection circuit 220 indicates that an AC signal from the position detection sensor 502 is detected, the power supply controlling circuit 3132 produces a power supply controlling signal Ps to turn on the FET 3141 of the power supply controlling circuit 314. On the other hand, when the signal detection output from the signal detection circuit 220 indicates that an AC signal from the position detection sensor 502 is not detected, the power supply controlling circuit 3132 does not produce a power supply controlling signal Ps and turns off the FET 3141 of the power supply controlling circuit 314.

Accordingly, similarly as in the case of the first and second embodiments described hereinabove, when the position pointer 1B is brought onto the position detection sensor 502 provided on the display screen 501 of the portable terminal incorporating a position detection sensor 500, since an AC signal from the position detection sensor 502 is detected by the signal detection circuit 220, the power supply controlling circuit 314 is turned on in response to the power supply controlling signal Ps from the power supply controlling circuit 3132. Therefore, the power supply voltage +Vcc is supplied to the transmission signal production circuit 100, and a transmission signal is sent out from the position pointer 1B to the position detection sensor 502.

When the signal detection circuit 220 does not detect an AC signal, the power supply controlling circuit 314 is turned off in response to the power supply controlling signal Ps from the power supply controlling circuit 3132, and the power supply voltage +Vcc is not supplied to the transmission signal production circuit 100. Therefore, the transmission signal production circuit 100 does not produce a transmission signal, and no transmission signal is sent out from the position pointer 1B to the position detection sensor 502.

It is to be noted that, in the present third embodiment, a series circuit of a resistor 3151 and an LED 3152 is connected between the output terminal of the power supply controlling circuit 314 and the grounding conductor. The LED 3152 is a light emitting element for indicating a driving state similar to the LED 43 in the first embodiment, and is provided such that the light emitting state thereof can be conveyed to the outside through a light-transmitting window (not shown) provided in the housing of the position pointer 1B.

Further, the output terminal of the power supply controlling circuit 314 is connected to the grounding conductor through a series connection of a resistor 3153 and another resistor 3154, and a reference voltage Vref (=Vcc/2) is output from the node between the resistor 3153 and the resistor 3154 to the transmission signal production circuit 100.

With the position pointer 1B of the third embodiment described hereinabove, since it includes the capacitor 3111 that forms the power storage circuit 311 and that can be charged from the outside in place of the battery, exchange of the battery becomes unnecessary and also the position pointer's weight is reduced. Further, the power stored in the power storage circuit 311 formed from the capacitor 3111 is supplied through the power supply controlling circuit 314 when the position pointer 1B detects an AC signal from the position detection sensor 502 on the position detection sensor 502 of the portable terminal incorporating a position detection sensor 500. Therefore, power saving is achieved and also the frequency at which charging is carried out can be reduced.

[First Modification to the Third Embodiment]

Figure 8:
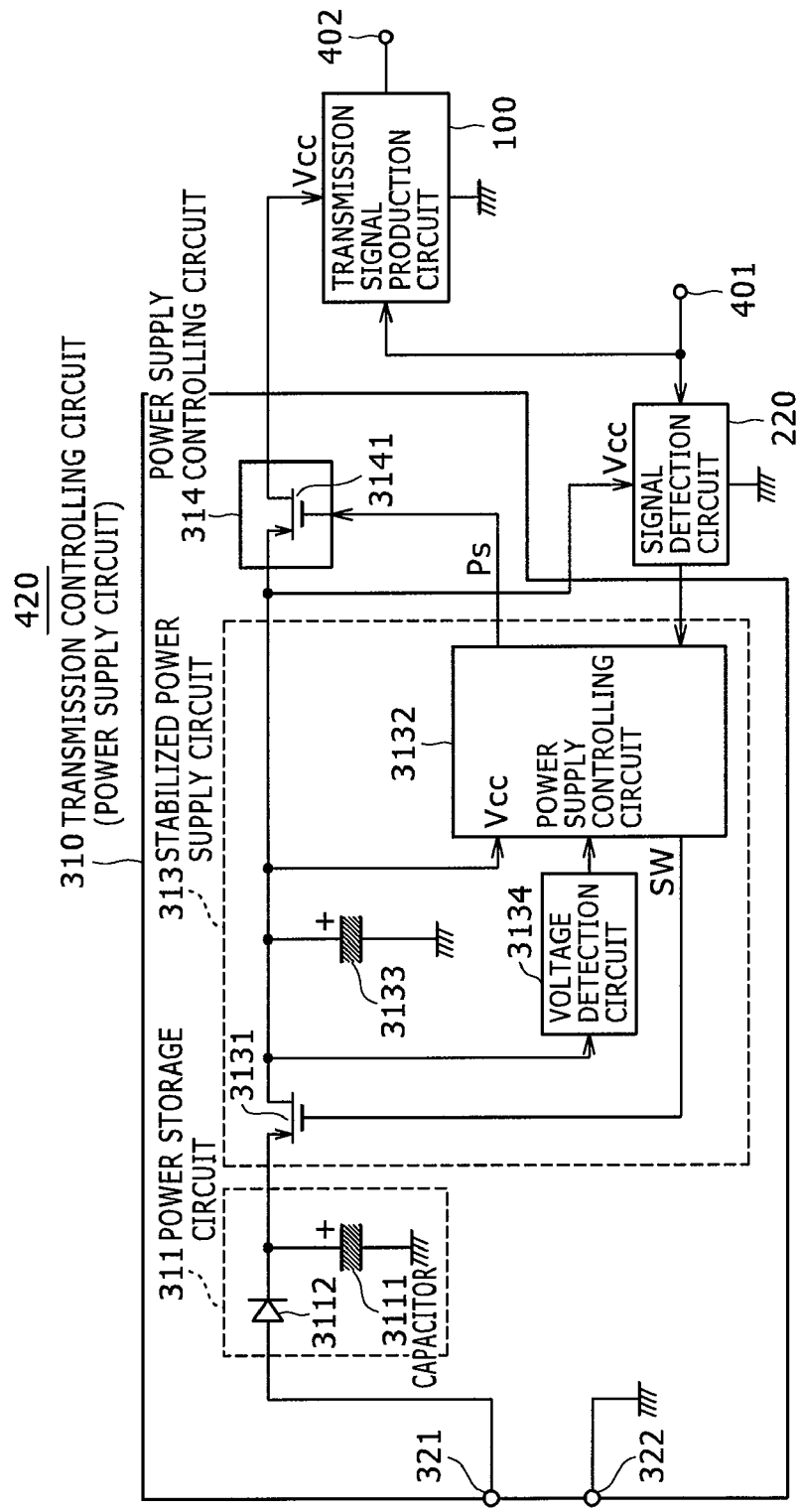
FIG. 8 is a circuit diagram showing an example of a circuit configuration of a first modification to the third embodiment of the position pointer according to the present invention.
Figure 9:
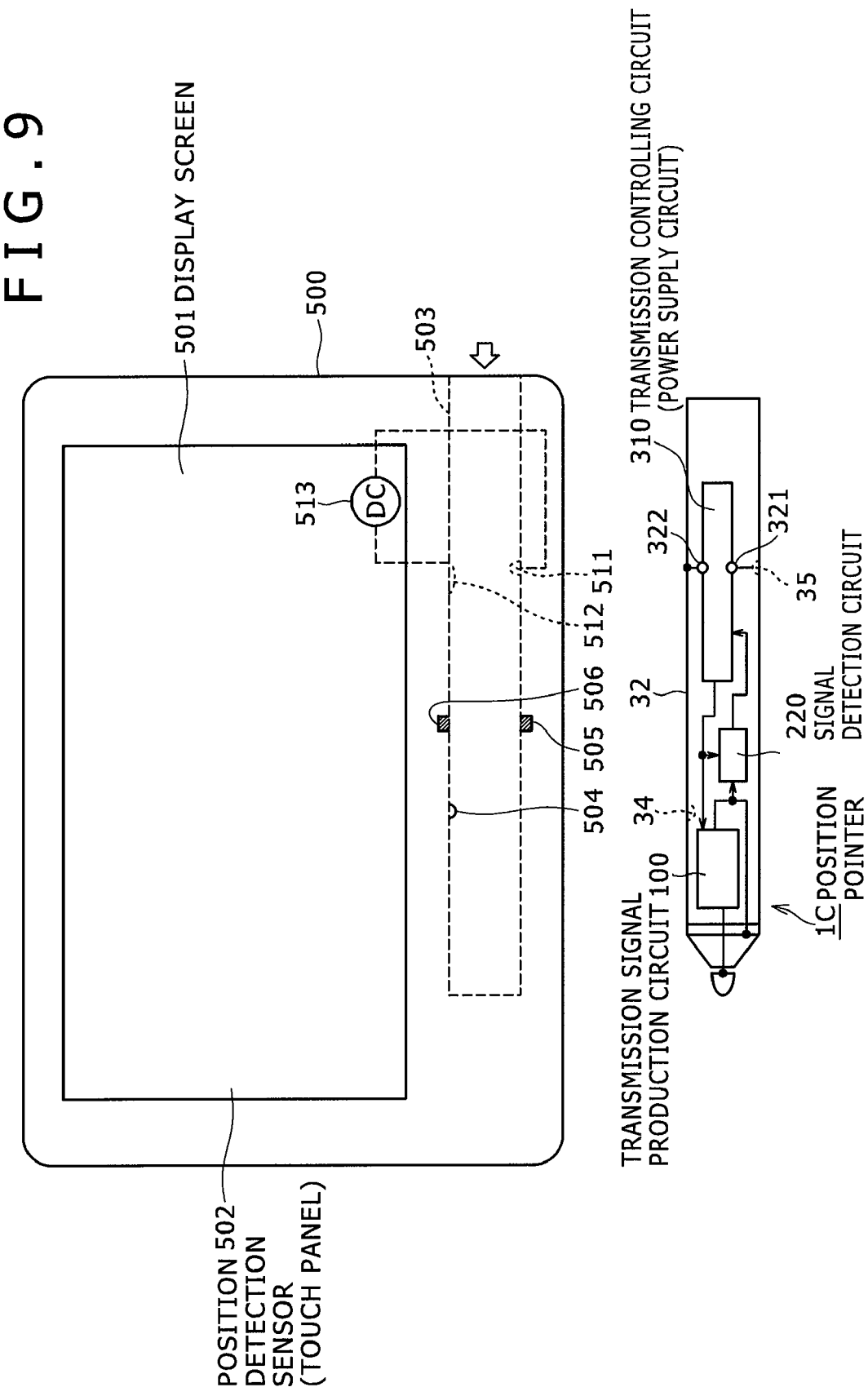
FIG. 9 is a view illustrating the first modification to the third embodiment of the position pointer according to the present invention together with a position detection sensor.

FIGS. 8 and 9 show a modification example to the third embodiment. As shown in FIG. 8, in an internal processing circuit 420 of a position pointer 1C of the present example, the electromagnetic coupling circuit 312 is not provided, but instead, a terminal 321 connected to the anode of the diode 3112 of the power storage circuit 311 and another terminal 322 connected to the grounding conductor are provided.

As shown in FIG. 9, the conductor portion 32 (refer to FIGS. 2A and 2C) on the outer circumferential surface of the housing 3 of the position pointer 1C is electrically connected to the terminal 322 connected to the grounding conductor. Further, in the present example, a metal electrode 35 electrically isolated from the conductor portion 32 and connected to the terminal 321 is provided on the outer circumferential surface of the housing 3 of the position pointer 1C. The metal electrode 35 can be configured by providing a recessed portion on the outer circumferential surface of the position pointer 1C, forming a metal layer electrically isolated from the conductor portion 32 in the recessed portion and electrically connecting the metal layer and the terminal 321.

In the accommodation section 503 of the portable terminal incorporating a position detection sensor 500, a metal electrode 511 is provided to engage with and to be electrically connected to the metal electrode 35, which is provided in the recessed portion of the position pointer 1C. Further, an electrode 512 formed from a metal leaf spring piece is provided and is elastically connected with the conductor portion 32 (connected to the grounding conductor) on the outer circumferential surface of the position pointer 1C. Between the electrode 511 and the electrode 512, a DC voltage supplying circuit 513 is connected for charging the capacitor 3111 of the power storage circuit 311 of the position pointer 1C. A control circuit (not shown) provided in the portable terminal incorporating a position detection sensor 500 monitors, for example, the light reception output of the light receiving element 506 as described hereinabove and carries out control such that, when it is detected that the position pointer 1C is accommodated in the accommodation section 503, an AC signal is supplied from the DC voltage supplying circuit 513 between the electrodes 511 and 512.

Accordingly, if the position pointer 1C is accommodated into the accommodation section 503 of the portable terminal incorporating a position detection sensor 500, then the electrode 35 and the conductor portion 32 are electrically connected to the electrode 511 and the electrode 512, respectively. As a result, a DC voltage from the DC voltage supplying circuit 513 of the portable terminal incorporating a position detection sensor 500 is supplied to the power storage circuit 311 of the position pointer 1C to thereby charge the capacitor 3111.

The configuration of the other portions is substantially similar to that in the third embodiment described hereinabove, and with the present modification to the third embodiment also, operations and effects similar to those achieved by the third embodiment can be achieved.

[Second Modification to the Third Embodiment]

In the third embodiment described hereinabove, when the position pointer 1B is accommodated in the accommodation section 503 of the portable terminal incorporating a position detection sensor 500, induced current is generated through the electromagnetic coupling circuit 312 to charge the power storage circuit 311 including the capacitor 3111. However, even when the position pointer 1B is not accommodated in the accommodation section 503, it is possible to charge the capacitor 3111.

Figure 10:
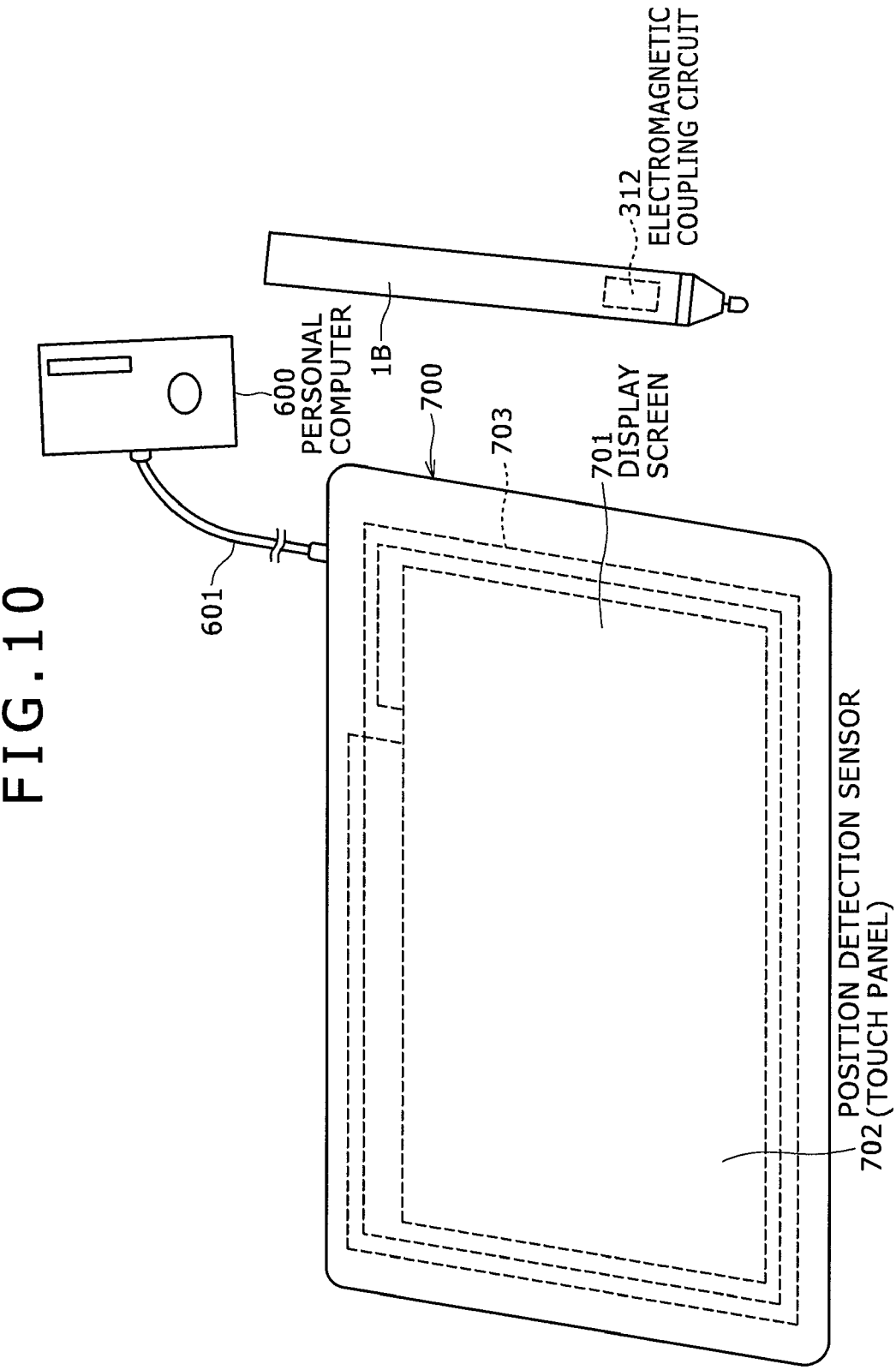
FIG. 10 is a circuit diagram showing an example of a circuit configuration of a second modification to the third embodiment of the position pointer according to the present invention.

In particular, FIG. 10 shows an example of such configuration, and this example illustrates an application directed to a system in which a display apparatus 700 is connected to a personal computer 600 by a cable 601. On a display screen 701 of the display apparatus 700, a position detection sensor (touch panel) 702 is attached similarly as in the portable terminal incorporating a position detection sensor 500.

In the display apparatus 700, a power supplying coil 703 is embedded in the display screen 701, that is, in an area outside the position detection sensor 702. The power supplying coil 703 is a loop coil wound around a position detection region of the position detection sensor 702 along a plane parallel to the display screen 701. The power supplying coil 703 performs a function equivalent to that, for example, of the magnetic field generating coil 507 shown in FIG. 7. Though not shown, by supplying an AC signal to the power supplying coil 703, an alternating magnetic field is generated in a direction perpendicular to a plane parallel to the display screen 701.

Accordingly, in a state in which an AC signal is supplied to the power supplying coil 703 provided in the display apparatus 700, when the position pointer 1B is positioned close to the power supplying coil 703, then induced current is generated in the electromagnetic coupling circuit 312 of the position pointer 1B by an alternating magnetic field generated by the power supplying coil 703. Then, the induced current charges the capacitor 3111 of the power storage circuit 311 of the position pointer 1B. In the case of the present example, it is preferable that the coil 3121 of the electromagnetic coupling circuit 312 of the position pointer 1B is provided at a position in an end portion of the position pointer 1B on the side on which the peripheral electrode 6 and the central electrode 7 are formed.

As described above, according to the present example, even if the position pointer 1B is not accommodated in an accommodation section or the like, simply by positioning the position pointer 1B in the proximity of an alternating magnetic field generated from the power supplying coil 703, the power storage circuit 311 of the position pointer 1B can be charged. It is to be noted that supply of an AC signal to the power supplying coil 703 of the display apparatus 700 is controlled based on detection by the position detection sensor 702 of whether or not the position pointed to by the position pointer 1B is in the proximity of the power supplying coil 703.

Fourth Embodiment

The position pointers 1, 1A and 1B of the embodiments described hereinabove are examples in the case where they are used together with the position detection sensor (2, 502), which can also detect a finger that is positioned closely or in contact with the sensor section by detecting the cross point that the finger is near or is in contact with.

Therefore, in the case of the position pointers 1, 1A and 1B of the embodiments described hereinabove, an AC signal to be fed back from the central electrode 7 to the position detection sensor 2 or the position detection sensor 502 is converted into a signal of the opposite phase to that of the AC signal supplied to the transmission conductor 23Y and is enhanced. Then, in the position detection sensor 2, a variation of the signal level of a reception signal of a reception conductor 24X corresponding to the position pointed to by the position pointer 1, 1A or 1B when the signal level becomes lower than that of reception signals of the other reception conductors 24X is detected, to thereby detect the position pointed to by the position pointer or the finger.

Thus, the position pointer of the present invention includes a configuration for enhancing an AC signal received from the position detection sensor and feeding back the enhanced AC signal to the position detection sensor. In this connection, it is possible to configure the position pointer of the present invention such that an AC signal received from the position detection sensor is enhanced, with the polarity maintained without inverting the phase, and is fed back to the position detection sensor. Such position pointer is for use with a position detection sensor, in which a variation of the signal level of the reception signal of a reception conductor 24X corresponding to the position pointed to by the position pointer becomes higher than that of reception signals of the other reception conductors 24X. Such variation of the reception signal level is detected to thereby detect the position pointed to by the position pointer.

Figure 11:
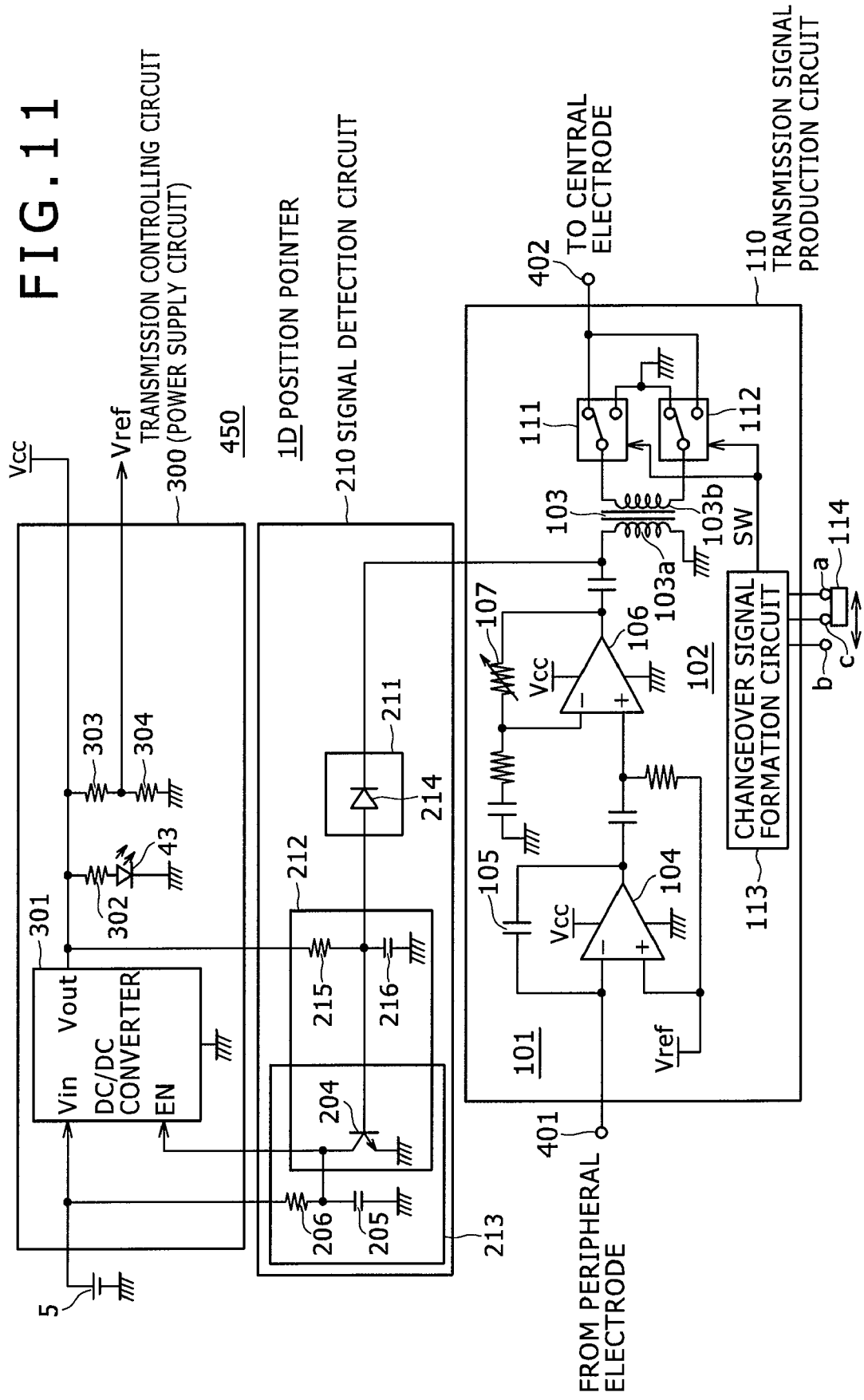
FIG. 11 is a circuit diagram showing an example of a circuit configuration of a fourth embodiment of the position pointer according to the present invention.

Taking the foregoing into consideration, the position pointer of the fourth embodiment is configured such that it is possible to switch between a case in which an AC signal received from the position detection sensor is converted into a signal of the opposite phase and enhanced and then fed back, and another case in which the received AC signal is enhanced with the phase (polarity) thereof maintained and then fed back. FIG. 11 shows an example of an internal processing circuit 450 of a position pointer 1D of the present fourth embodiment. The example of FIG. 11 is a case in which the fourth embodiment is applied to the second embodiment. However, it is also possible to apply the fourth embodiment to the first embodiment or the third embodiment.

In the internal processing circuit 450 in the fourth embodiment, only the transmission signal production circuit 100 of the internal processing circuit 400 in the second embodiment is altered to the configuration of a transmission signal production circuit 110, and the configuration of the signal detection circuit 210 and the transmission controlling circuit 300 is substantially similar to that in the second embodiment.

Further, the transmission signal production circuit 110 has a configuration similar to that of the transmission signal production circuit 100 in the second embodiment, except that an additional circuit is provided on the secondary coil 103b side of the boosting transformer 103.

In particular, in the transmission signal production circuit 110, a switch circuit 111 is connected to one end side of the secondary coil 103b of the boosting transformer 103 while another switch circuit 112 is connected to the other end side of the secondary coil 103b. The switch circuits 111 and 112 are switch circuits for switching the one end side and the other end side of the secondary coil 103b between a state in which they are connected to the connection terminal 402 and another state in which they are connected to the ground terminal.

The switch circuits 111 and 112 are switched in an interlocked relationship with each other in accordance with a changeover signal SW output from a changeover signal formation circuit 113 such that, in a state in which the one (first) end side of the secondary coil 103b is connected to the connection terminal 402, the other (second) end side of the secondary coil 103b is connected to the grounding conductor, and in another state in which the other (second) end side of the secondary coil 103b is connected to the connection terminal 402, the one (first) end side of the secondary coil 103b is connected to the grounding conductor.

In the changeover signal formation circuit 113, a slide switch 114 to be slidably operated from the outside is provided on a housing of the position pointer 1D of the fourth embodiment. In a switching state of the slide switch 114 in which, for example, a contact c and a contact a are connected to each other, the changeover signal formation circuit 113 forms a changeover signal SW for controlling the switch circuit 111 and the switch circuit 112 such that the one (first) end side of the secondary coil 103b of the boosting transformer 103 is connected to the connection terminal 402 and the other (second) end side of the secondary coil 103b is connected to the ground terminal. On the other hand, when the slide switch 114 is in another switching state in which the contact c and a contact b are connected to each other, the changeover signal formation circuit 113 forms a changeover signal SW for controlling the switch circuit 111 and the switch circuit 112 such that the other (second) end side of the secondary coil 103b of the boosting transformer 103 is connected to the connection terminal 402 and the one (first) end side of the secondary coil 103b is connected to the ground terminal.

Accordingly, in the switching state of the slide switch 114 in which the contact c and the contact a are connected to each other, as is the case of the second embodiment, an AC signal received from the position detection sensor 2 is converted into a signal of the opposite phase, enhanced, and then the phase-inversed and enhanced signal is supplied to the central electrode 7 through the connection terminal 402 to be fed back to the position detection sensor 2.

On the other hand, when the slide switch 114 is in the switching state in which the contact c and the contact b are connected to each other, an AC signal received from the position detection sensor 2 is enhanced with the polarity thereof maintained and then the enhanced signal is supplied to the central electrode 7 through the connection terminal 402 to be fed back to the position detection sensor 2.

The position pointer 1D of the fourth embodiment carries out switching by the slide switch 114, depending on which detection method is to be used to detect a variation in the reception signal level of a reception conductor in a position detection sensor. Specifically, if the position detection sensor, to which position pointing inputting is to be carried out by the position pointer 1D, adopts a detection method of detecting a variation in the reception signal level of a reception conductor when the reception signal level becomes lower than that of reception signals of the other reception conductors, the slide switch 114 is placed into a switching state in which the contact c and the contact a are connected to each other. On the other hand, if the position detection sensor, to which position pointing inputting is to be carried out by the position pointer 1D, adopts another detection method of detecting a variation in the reception signal level of a reception conductor when the reception signal level becomes higher than that of reception signals of the other reception conductors, the slide switch 114 is placed into a switching state in which the contact c and the contact b are connected to each other.

In other words, the position pointer 1D of the fourth embodiment can be used in an optimum state with either one of the position detection sensors implementing either one of the above-described detection methods.

In the case where the position detection sensor has a configuration in which both of the detection methods are executed, for example, in a time-division driving manner, it is possible for the position detection sensor to determine whether the pointing input is originating from the position pointer 1D or a finger by placing the slide switch 114 into the switching state in which the contact c and the contact b are connected to each other (or into the switching state in which the contact c and the contact a are connected to each other).

For example, a pointing input by the position pointer 1D (as opposed to by a finger), in which the slide switch 114 is placed in the switching state in which the contact c and the contact b are connected to each other, is detected only within a time division period during which a variation in the reception signal level of a reception conductor is detected when the reception signal level becomes higher than the signal level of the reception signals of the other reception conductors. On the other hand, a pointing input by the finger is detected only within a time division period during which a variation in the reception signal level of a reception conductor is detected when the reception signal level becomes lower than the signal level of the reception signals of the other reception conductors. In other words, the position detection sensor can distinguish between a pointing input by the position pointer 1D and a pointing input by a finger by determining whether the signal level of the reception signal rises to a higher level or drops to a lower level during signal level variation.

Fifth Embodiment

The peripheral electrode 6 and the central electrode 7 of any of the position pointers of the embodiments described hereinabove are both provided on one end side of the housing 3 of the position pointer. Therefore, there is a possibility that the peripheral electrode 6 and the central electrode 7 may be capacitively coupled to each other, and that a portion of a transmission signal sent out to the position detection sensor leaks from the transmission electrode to the reception electrode. Therefore, it is desirable or necessary to increase the transmission power in the transmission signal production circuits 100 and 110 by an amount corresponding to the leak amount of the transmission signal.

Figure 12:
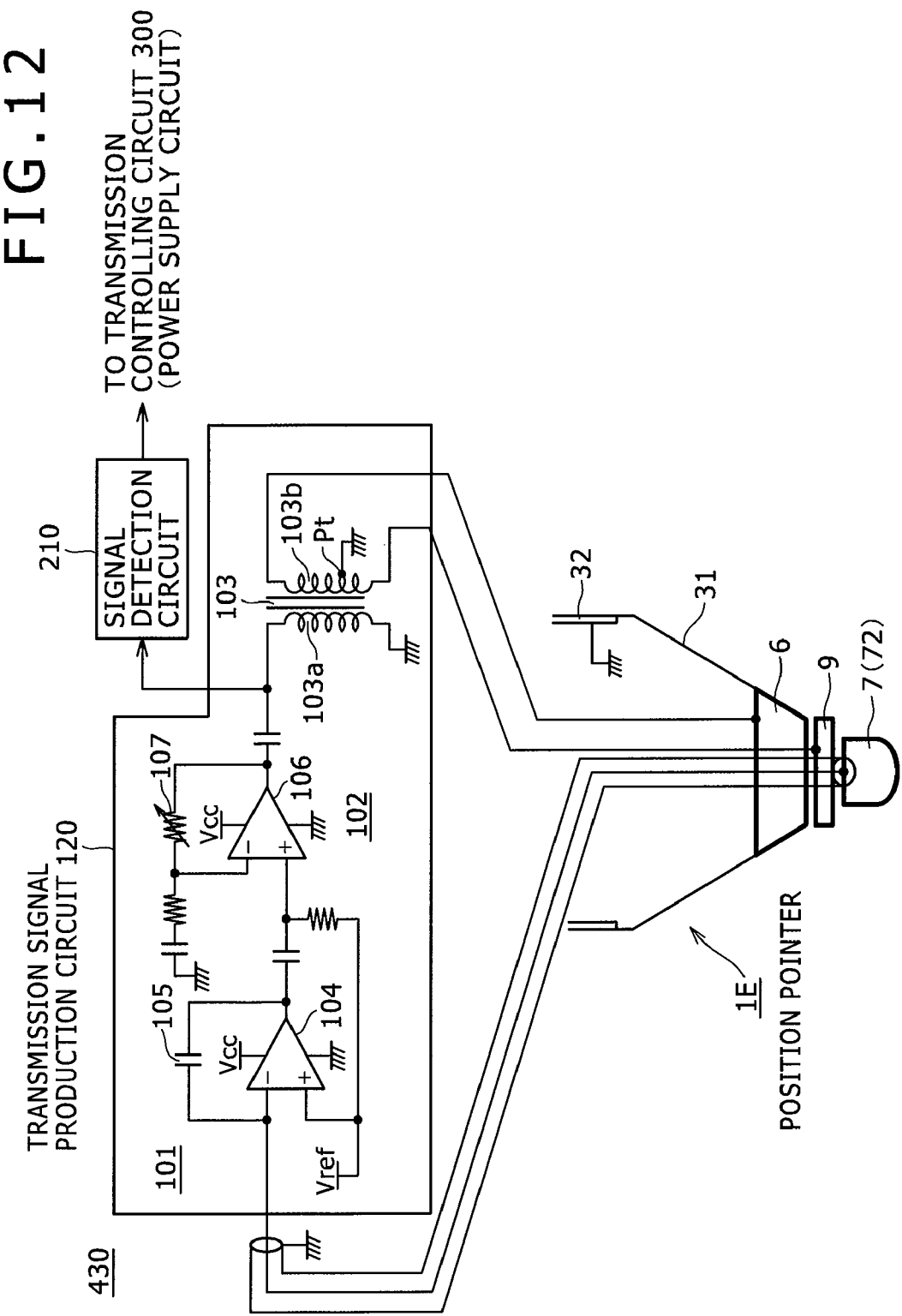
FIG. 12 is a circuit diagram showing an example of a circuit configuration of a fifth embodiment of the position pointer according to the present invention.

The fifth embodiment is an example in which the leak amount of the transmission signal is minimized to reduce increase in the transmission power to thereby achieve power saving. FIG. 12 shows an example of an internal processing circuit 430 in a position pointer 1E of the fifth embodiment.

The internal processing circuit 430 of the position pointer 1E of the fifth embodiment shown in FIG. 12 has a configuration similar to that of the internal processing circuit 400 in the second embodiment. Therefore, the same elements to those of the internal processing circuit 400 of the second embodiment shown in FIG. 5 are denoted by the same reference symbols. The internal processing circuit 430 in the fifth embodiment is configured from a transmission signal production circuit 120, the signal detection circuit 210, and the transmission controlling circuit 300. As shown in FIG. 12, the configuration of the transmission signal production circuit 120 is different from that of the transmission signal production circuit 100 in the second embodiment.

Further, in the position pointer 1E of the fifth embodiment, a conductive material 9 is provided at a position between the peripheral electrode 6 and the central electrode 7. The conductive material 9 is, for example, formed of a ring-shaped conductive metal member and provided in an electrically isolated relationship from both the peripheral electrode 6 and the central electrode 7, as shown in the figure.

Further, while, in the second embodiment, the peripheral electrode 6 serves as the first electrode and the central electrode 7 servers as the second electrode as described hereinabove, the central electrode 7 may serve as the first electrode and the peripheral electrode 6 may serve as the second electrode. The fifth embodiment is an example of the latter case. In particular, in the position pointer 1E of the fifth embodiment, an AC signal received from the position detection sensor through the central electrode 7 is used as an input signal to the transmission signal production circuit 120.

In the present fifth embodiment, a determined tap point Pt intermediately of the secondary coil 103b of the boosting transformer 103 is used as a common terminal and connected to the grounding conductor. The secondary coil 103b is electrically connected on one end side thereof to the peripheral electrode 6 serving as the second electrode and is electrically connected on the other end side thereof to the conductive material 9.

The position of the tap point Pt of the secondary coil 103b is determined based on a degree to which a transmission signal sent out from the peripheral electrode 6 is not supplied to the position detection sensor and instead is supplied to the central electrode 7. In other words, for example, provided that 5% of the transmission signal sent out from the peripheral electrode 6 is supplied to the central electrode 7, then the position of the tap point Pt is set so as to satisfy following formula:

(the turn number from tap point *Pt* to one end side of secondary coil 103*b*):(the turn number from tap point *Pt* to the opposite end side of secondary coil 103*b*)=95:5

In this instance, since the portion of the transmission signal sent out from the peripheral electrode 6, which is supplied to the central electrode 7, is typically smaller than half of the transmission signal sent out from the peripheral electrode 6, the turn number from the tap point Pt to the opposite (second) end side of the secondary coil 103b is smaller than the turn number from the tap point Pt to the one (first) end side of the secondary coil 103b.

If such a configuration as just described is adopted, then a signal of the opposite phase as compared to that of the transmission signal sent out from the peripheral electrode 6 is sent out from the conductive material 9. With the signal sent from the conductive material 9, the portion of the transmission signal sent from the peripheral electrode 6, which leaks to the central electrode 7, is compensated for, and the transmission signal from the peripheral electrode 6 is efficiently fed back to the position detection sensor. Accordingly, since leakage of the transmission signal from the transmission signal production circuit 120, from the peripheral electrode 6 to the central electrode 7, is reduced, the transmission power need not be increased as much, and hence further power saving can be achieved.

It is to be noted that, while, in the example of the fifth embodiment of FIG. 12, the first electrode for receiving an AC signal from the position detection sensor is the central electrode 7 and the second electrode for feedback-transmitting the AC signal to the position detection sensor is the peripheral electrode 6, of course the fifth embodiment can be applied also in a case in which the first electrode is the peripheral electrode 6 and the second electrode is the central electrode 7.

Sixth Embodiment

The internal processing circuits of the position pointers of the embodiments described above are all configured such that an AC signal received from the position detection sensor is enhanced and fed back to the position detection sensor. However, the present invention is not limited to the position pointer, which includes an internal processing circuit to feed back the signal, and can be applied also to a position pointer of the type in which an AC signal to be supplied to the position detection sensor is generated from an AC signal generation circuit provided in the position pointer. The sixth embodiment is an example of this type of a position pointer.

Figure 13:
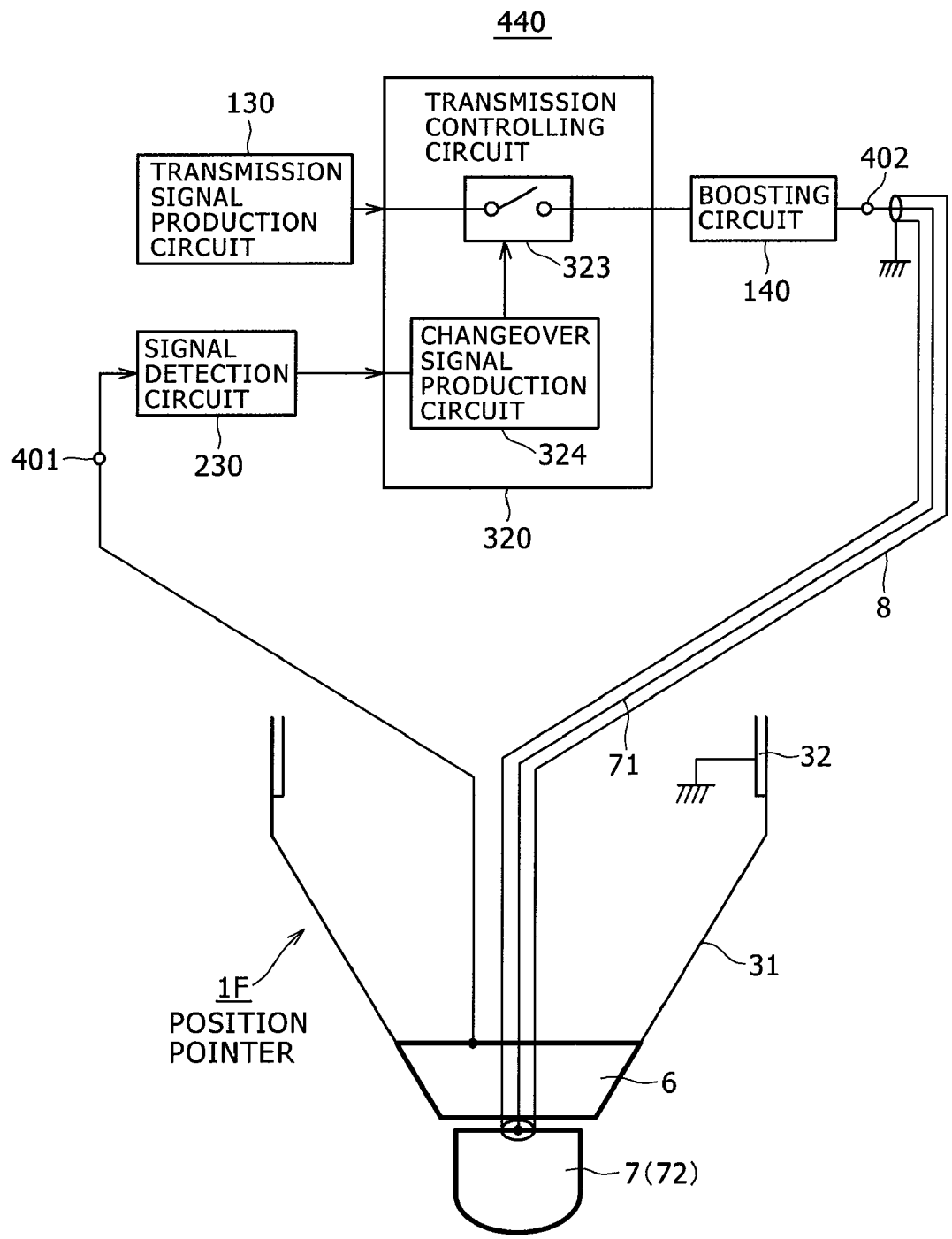
FIG. 13 is a circuit diagram showing an example of a circuit configuration of a sixth embodiment of the position pointer according to the present invention.

FIG. 13 is a view illustrating several components of a position pointer 1F of the sixth embodiment. Similarly to the examples described hereinabove, the position pointer 1F of the present sixth embodiment also has a structural configuration similar to that of the position pointer 1 of the first embodiment shown in FIGS. 2A, 2B and 2C. However, an internal processing circuit 440 is different from the internal processing circuits of the examples described hereinabove.

In particular, as shown in FIG. 13, the internal processing circuit 440 is configured from a transmission signal production circuit 130, a signal detection circuit 230, a transmission controlling circuit 320 and a boosting circuit 140.

The transmission signal production circuit 130 is a generation circuit configured to generate an AC signal of a determined frequency, and may be configured of an AC signal oscillator. A transmission signal (AC signal) from the transmission signal production circuit 130 is supplied to the connection terminal 402, through the transmission controlling circuit 320 and the boosting circuit 140, and is transmitted to the position detection sensor through the central electrode 7 connected to the connection terminal 402.

The transmission controlling circuit 320 is configured from a switch circuit 323 formed of a switching transistor or the like, and a changeover signal production circuit 324 for supplying a changeover signal to the switch circuit 323. The switch circuit 323 controls supply of the AC signal from the transmission signal production circuit 130 to the boosting circuit 140.

Although it is possible to configure the boosting circuit 140 from a boosting transformer similarly as in the embodiments described hereinabove, in the present example, a boosting circuit formed from a semiconductor element is used. A transmission signal from the transmission signal production circuit 130 is boosted by the boosting circuit 140 and then supplied to the central electrode 7 through the connection terminal 402.

The signal detection circuit 230 is connected at the input terminal thereof to the connection terminal 401 to which the peripheral electrode 6 is connected. Accordingly, if the position pointer 1F points to a position on the position detection sensor, then an AC signal from the position detection sensor is received through the peripheral electrode 6 and input to the signal detection circuit 230.

The signal detection circuit 230 can be configured, for example, from a pulse production circuit and a retriggerable monostable multivibrator similarly to the signal detection circuit 200. Accordingly, the signal detection circuit 230 outputs a detection signal, whose state is switched depending upon whether an AC signal from the position detection sensor is detected or not.

The detection signal from the signal detection circuit 230 is supplied to the changeover signal production circuit 324 of the transmission controlling circuit 320. The changeover signal production circuit 324 generates a changeover signal for turning on the switch circuit 323 when the detection signal of the signal detection circuit 230 indicates that an AC signal from the position detection sensor is detected, and supplies the changeover signal to the switch circuit 323. On the other hand, when the detection signal of the signal detection circuit 230 indicates that an AC signal from the position detection sensor is not detected, the changeover signal production circuit 324 produces a changeover signal for turning off the switch circuit 323 and supplies the changeover signal to the switch circuit 323.

Accordingly, when the position pointer 1F does not exist on the position detection sensor and an AC signal from the position detection sensor cannot be detected, since an AC signal from the position detection sensor is not detected by the signal detection circuit 230, the switch circuit 323 of the transmission controlling circuit 320 is turned off, and transmission of an AC signal from the position pointer 1F is not carried out. Therefore, power saving can be achieved.

On the other hand, when the position pointer 1F points to a position on the position detection sensor, an AC signal from the position detection sensor is detected by the signal detection circuit 230, and the switch circuit 323 is turned on by a changeover signal produced based on a detection signal of the signal detection circuit 230. Consequently, a transmission signal (AC signal) from the transmission signal production circuit 130 is supplied through the transmission controlling circuit 320 to the boosting circuit 140 and boosted, and then transmitted from the central electrode 7 to the position detection sensor.

Also in the present sixth embodiment, the position pointer 1F carries out transmission of a transmission signal when an AC signal from the position detection sensor can be detected, and consequently, power saving can be achieved.

It is to be noted that, while, in the configuration of FIG. 13, power saving is achieved by controlling the supply of a transmission signal to the second electrode, the position pointer 1F of the sixth embodiment can also be configured so as to achieve power saving by controlling the power supply circuit similarly as in the embodiments described hereinabove.

Other Embodiments and Modifications

While, in the embodiments described hereinabove, the conductor portion 32 on the outer periphery of the housing 3 of the position pointer is connected directly (in DC) to the grounding conductor of the printed wiring board, on which the signal processing circuit is formed, in the housing 3 of the position pointer, the grounding conductor of the internal circuit and the conductor portion 32 may be configured so as to be coupled to each other by an AC coupling, for example, through a capacitor.

Further, while, in the embodiments described hereinabove, the conductor portion 32 covers a substantially entire periphery of the housing 3 of the position pointer, except for an isolating portion relative to the peripheral electrode 6, a conductive member such as a metal plate connected to the grounding conductor of the internal circuit may be disposed only at a determined portion of the housing 3 to be held (gripped) by the user or become in contact with the human body when the user operates the position pointer.

Further, in the case where the housing 3 is configured, for example, from plastics, a plastic material having conductivity may be used and connected to the grounding conductor of the internal circuit by a DC connection or an AC connection such that the conductor portion 32 can be omitted.

It is to be noted that the position detection sensor with which the position pointer of the present invention is used is not limited to the examples described hereinabove, but may be various position detector sensors which are utilized, for example, with an installed-type (as opposed to at portable type) position detection apparatus.

The invention claimed is:

1. A position pointer for indicating a position on a sensor of a position detection device, the position pointer comprising:
   an elongate pointer body having a distal end and a proximal end;
   a central electrode disposed near the distal end of the elongate pointer body, wherein the central electrode includes a tip that extends beyond the distal end of the elongate pointer body;
   a peripheral electrode disposed near the distal end of the elongate pointer body and surrounding the central electrode;
   a detection circuit configured to detect a first signal transmitted from the position detection device via the peripheral electrode;
   a transmission signal generation circuit configured to generate a second signal and transmit the second signal via the central electrode to the position detection device;
   a power storage circuit configured to store driving power supplied from an external device; and
   a stabilized power supply circuit coupled to the power storage circuit, wherein the stabilized power supply circuit includes a power supply control circuit and configured to generate a stabilized driving voltage for driving the position pointer from an output of the driving power stored in the power storage circuit,
   wherein the stabilized driving voltage drives the transmission signal generation circuit to generate and transmit the second signal via the central electrode to the position detection device, and
   wherein the power supply control circuit is configured, based on a detection of the first signal by the detection circuit, to enable the stabilized power supply circuit to drive the transmission signal generation circuit to generate and transmit the second signal via the central electrode to the position detection device.

2. The position pointer of claim 1, wherein the power storage circuit is configured to store the driving power which is wirelessly supplied from the external device.

3. The position pointer of claim 1, wherein the power supply control circuit is configured to generate the stabilized driving voltage by performing Pulse Width Modulation (PWM) of the driving power.

4. The position pointer of claim 1, wherein the power supply control circuit, based on the detection circuit not detecting the first signal, intermittently supplies the stabilized driving voltage to the detection circuit, to cause the detection circuit to correspondingly intermittently attempt to detect the first signal.

5. The position pointer of claim 1, comprising a coupling node to be coupled to the external device, wherein the power storage circuit is configured to receive the driving power supplied from the external device via the coupling node.

6. The position pointer of claim 1, wherein the central electrode and the peripheral electrode are capacitively coupleable with the sensor of the position detection device.

7. The position pointer of claim 1, wherein the external device is the position detection device.

8. The position pointer of claim 1, wherein the stabilized power supply circuit further includes a stabilizing capacitor configured to store the stabilized driving voltage.

9. The position pointer of claim 8, wherein the stabilized power supply circuit further includes a transistor coupled to the stabilizing capacitor, and the power supply control circuit is coupled to a gate of the transistor.

10. The position pointer of claim 9, wherein the power supply control circuit generates the stabilized driving voltage by controlling the transistor to perform Pulse Width Modulation (PWM) of the driving power supplied from the power storage circuit.

11. The position pointer of claim 1, wherein the power storage circuit is configured to receive the driving power electromagnetically from the external device.

12. The position pointer of claim 1, wherein the power storage circuit is configured to receive the driving power using a coil which is coupled to the power storage circuit.

13. A position pointer for indicating a position on a sensor of a position detection device, the position pointer comprising:
  an elongate pointer body having a distal end and a proximal end;
  a central electrode disposed near the distal end of the elongate pointer body; wherein the central electrode includes a tip that extends beyond the distal end of the elongate pointer body;
  a peripheral electrode disposed near the distal end of the elongate pointer body and surrounding the central electrode;
  a detection circuit configured to detect a first signal transmitted from the position detection device via the peripheral electrode;
  a transmission signal generating circuit configured to generate a second signal and transmit the second signal via the central electrode to the position detection device;
  a coupling circuit formed of a coil and configured to receive driving power wirelessly supplied from an eternal device via the coil;
  a power storage circuit coupled to the coupling circuit and configured to store the driving power; and
  a stabilized power supply circuit coupled to the power storage circuit, wherein the stabilized power supply circuit includes a power supply control circuit and configured to generate a stabilized driving voltage for driving the position pointer from an output of the driving power stored in the power storage circuit,
  wherein the stabilized driving voltage drives the transmission signal generating circuit to generate and transmit the second signal via the central electrode to the position detection device, and
  wherein the power supply control circuit is configured, based on a detection of the first signal by the detection circuit, to enable the stabilized power supply circuit to drive the transmission signal generation circuit to generate and transmit the second signal via the central electrode to the position detection device.

14. The position pointer of claim 13, wherein the power supply control circuit, based on the detection circuit not detecting the first signal, intermittently supplies the stabilized driving voltage to the detection circuit, to cause the detection circuit to correspondingly intermittently attempt to detect the first signal.

15. The position pointer of claim 13, wherein the stabilized power supply circuit further includes a stabilizing capacitor configured to store the stabilized driving voltage.

16. The position pointer of claim 15, wherein the stabilized power supply circuit further includes a transistor coupled to the stabilizing capacitor, and the power supply control circuit is coupled to a gate of the transistor.

17. The position pointer of claim 16, wherein the power supply control circuit generates the stabilized driving voltage by controlling the transistor to perform Pulse Width Modulation (PWM) of the driving power supplied from the power storage circuit.

18. A position pointer for indicating a position on a sensor of a position detection device, the position pointer comprising:
  an elongate pointer body having a distal end and a proximal end;
  a central electrode disposed near the distal end of the elongate pointer body; wherein the central electrode includes a tip that extends beyond the distal end of the elongate pointer body;
  a peripheral electrode disposed near the distal end of the elongate pointer body and surrounding the central electrode;
  a detection circuit configured to detect a first signal transmitted from the position detection device via the peripheral electrode;
  a transmission signal generating circuit configured to generate a second signal and transmit the second signal via the central electrode to the position detection device;
  a power storage circuit configured to store driving power supplied from an external device;
  a coupling node coupled to the external device, wherein the power storage circuit is configured to receive the driving power supplied from the external device via the coupling node; and
  a stabilized power supply circuit coupled to the power storage circuit, wherein the stabilized power supply circuit includes a power supply control circuit and configured to generate a stabilized driving voltage for driving the position pointer from an output of the driving power stored in the power storage circuit,
  wherein the stabilized driving voltage drives the transmission signal generating circuit to generate and transmit the second signal via the central electrode to the position detection device, and
  wherein the power supply control circuit is configured, based on a detection of the first signal by the detection circuit, to enable the stabilized power supply circuit to drive the transmission signal generation circuit to generate and transmit the second signal via the central electrode to the position detection device.

19. The position pointer of claim 18, wherein the power supply control circuit, based on the detection circuit not detecting the first signal, intermittently supplies the stabilized driving voltage to the detection circuit, to cause the detection circuit to correspondingly intermittently attempt to detect the first signal.

20. The position pointer of claim 18, wherein the stabilized power supply circuit further includes a stabilizing capacitor configured to store the stabilized driving voltage.

* * * * *